(12) United States Patent
Wilcox et al.

(10) Patent No.: US 9,423,096 B2
(45) Date of Patent: Aug. 23, 2016

(54) LED LIGHTING APPARATUS

(71) Applicant: Cree, Inc., Durham, NC (US)

(72) Inventors: Kurt S. Wilcox, Libertyville, IL (US); Mario A. Castillo, Racine, WI (US)

(73) Assignee: Cree, Inc., Durham, NC (US)

( * ) Notice: Subject to any disclaimer, the term of this patent is extended or adjusted under 35 U.S.C. 154(b) by 667 days.

(21) Appl. No.: 13/623,006

(22) Filed: Sep. 19, 2012

(65) Prior Publication Data

US 2013/0250575 A1    Sep. 26, 2013

Related U.S. Application Data

(63) Continuation-in-part of application No. 12/173,721, filed on Jul. 15, 2008, now Pat. No. 8,388,193.

(60) Provisional application No. 61/536,560, filed on Sep. 19, 2011, provisional application No. 61/055,958, filed on May 23, 2008.

(51) Int. Cl.
    *F21S 8/02*    (2006.01)
    *F21V 5/00*    (2015.01)
    (Continued)

(52) U.S. Cl.
    CPC .................. *F21V 5/007* (2013.01); *F21S 8/02* (2013.01); *F21V 5/04* (2013.01); *F21V 5/08* (2013.01);
    (Continued)

(58) Field of Classification Search
    CPC ............ F21S 6/005; F21S 8/032; F21S 8/02; F21S 8/088; F21V 13/04; F21V 23/004; F21V 29/777; F21V 5/007; F21V 5/008; F21V 5/04; F21V 7/0091; G02B 19/0061; G02B 19/0028; F21W 2131/10; F21Y 2111/005; F21Y 2101/02
    USPC ............................................... 362/327, 153.1
    See application file for complete search history.

(56) References Cited

U.S. PATENT DOCUMENTS

| 1,404,004 A | 1/1922 | Benford |
| 1,535,486 A | 4/1925 | Lundy |

(Continued)

FOREIGN PATENT DOCUMENTS

| DE | 19507234 A1 | 9/1996 |
| EP | 1107210 A2 | 6/2001 |

(Continued)

OTHER PUBLICATIONS

Future Lighting Solutions "the 6 Steps to LED Lighting Success" brochure. Date: undated. 6 pages.

(Continued)

*Primary Examiner* — Sharon Payne
(74) *Attorney, Agent, or Firm* — Jansson Munger McKinley & Kirby Ltd.

(57) ABSTRACT

An LED lighting apparatus including a plurality of lens members aligned substantially along a preferential/non-preferential line. Each lens member being elongate across the preferential/non-preferential line with all elongate lens members being in substantially same orientation and each configured for light to exit the unitary lens predominantly toward the preferential side. Each lens member includes an elongate opening for receiving light from a group of emitters aligned across the preferential/non-preferential line; a refracting inner surface forming a void and having a racetrack-shaped surrounding surface extending from the opening to a substantially planar elongate end surface; and a lateral surface having opposed preferential and non-preferential surface portions, the non-preferential portion being at an angle to the base plane which is greater than the angle of the preferential portion to the base plane.

25 Claims, 41 Drawing Sheets

(51) Int. Cl.

| | | |
|---|---|---|
| *F21V 5/04* | (2006.01) | |
| *F21V 13/04* | (2006.01) | |
| *F21V 5/08* | (2006.01) | |
| *G02B 19/00* | (2006.01) | |
| *F21V 23/00* | (2015.01) | |
| *F21V 7/00* | (2006.01) | |
| *F21Y 101/02* | (2006.01) | |
| *F21S 8/08* | (2006.01) | |
| *F21W 131/10* | (2006.01) | |
| *F21Y 111/00* | (2016.01) | |
| *F21V 29/77* | (2015.01) | |

(52) U.S. Cl.
CPC .............. *F21V 13/04* (2013.01); *F21V 23/004* (2013.01); *G02B 19/0028* (2013.01); *G02B 19/0061* (2013.01); *F21S 8/088* (2013.01); *F21V 7/0091* (2013.01); *F21V 29/777* (2015.01); *F21W 2131/10* (2013.01); *F21Y 2101/02* (2013.01); *F21Y 2111/005* (2013.01)

(56) References Cited

U.S. PATENT DOCUMENTS

| | | |
|---|---|---|
| 2,007,033 A | 7/1935 | Williams |
| 2,212,876 A | 8/1940 | Chauvet |
| 2,254,961 A | 9/1941 | Harris |
| 2,802,097 A | 8/1957 | Franck |
| 2,908,197 A | 10/1959 | Wells et al. |
| 3,497,687 A | 2/1970 | Hermann |
| 3,625,615 A | 12/1971 | Wilson |
| 4,186,995 A | 2/1980 | Schumacher |
| 4,254,453 A | 3/1981 | Mouyard et al. |
| 4,336,580 A | 6/1982 | Mouyard et al. |
| 4,345,308 A | 8/1982 | Mouyard et al. |
| 4,650,998 A | 3/1987 | Martin |
| 4,767,172 A | 8/1988 | Nichols et al. |
| 4,845,600 A | 7/1989 | Matsumura et al. |
| 4,862,330 A | 8/1989 | Machida et al. |
| 4,935,665 A | 6/1990 | Murata |
| 4,941,072 A | 7/1990 | Yasumoto et al. |
| 5,001,609 A | 3/1991 | Gardner et al. |
| 5,013,144 A | 5/1991 | Silverglate et al. |
| 5,014,165 A | 5/1991 | Naganawa |
| 5,062,027 A | 10/1991 | Machida et al. |
| 5,127,728 A | 7/1992 | Warren et al. |
| 5,174,649 A | 12/1992 | Alston |
| RE34,254 E | 5/1993 | Dragoon |
| 5,289,082 A | 2/1994 | Komoto |
| 5,302,778 A | 4/1994 | Maurinus |
| 5,349,504 A | 9/1994 | Simms et al. |
| 5,592,578 A | 1/1997 | Ruh |
| 5,784,209 A | 7/1998 | Manabe |
| 5,813,743 A | 9/1998 | Naka |
| 5,813,752 A | 9/1998 | Singer et al. |
| 5,865,529 A | 2/1999 | Yan |
| 5,995,291 A | 11/1999 | Togino |
| 6,097,549 A | 8/2000 | Jenkins et al. |
| 6,229,160 B1 | 5/2001 | Krames et al. |
| 6,244,727 B1 | 6/2001 | Ryan, Jr. et al. |
| 6,250,787 B1 | 6/2001 | Matubara |
| 6,273,596 B1 | 8/2001 | Parkyn, Jr. |
| 6,274,924 B1 | 8/2001 | Carey et al. |
| 6,283,613 B1 | 9/2001 | Schaffer |
| 6,296,376 B1 | 10/2001 | Kondo et al. |
| 6,323,063 B2 | 11/2001 | Krames et al. |
| 6,361,190 B1 | 3/2002 | McDermott |
| 6,361,192 B1 | 3/2002 | Fussell et al. |
| 6,443,594 B1 | 9/2002 | Marshall et al. |
| 6,473,238 B1 | 10/2002 | Daniell |
| 6,481,130 B1 | 11/2002 | Wu |
| 6,498,355 B1 | 12/2002 | Harrah et al. |
| 6,502,956 B1 | 1/2003 | Wu |
| 6,504,301 B1 | 1/2003 | Lowery |
| 6,541,800 B2 | 4/2003 | Barnett et al. |
| 6,547,423 B2 | 4/2003 | Marshall et al. |
| 6,550,940 B2 | 4/2003 | Kamiya et al. |
| 6,554,451 B1 | 4/2003 | Keuper |
| 6,570,190 B2 | 5/2003 | Krames et al. |
| 6,598,998 B2 | 7/2003 | West et al. |
| 6,601,962 B1 | 8/2003 | Ehara et al. |
| 6,607,286 B2 | 8/2003 | West et al. |
| 6,616,299 B2 | 9/2003 | Martineau |
| 6,637,921 B2 | 10/2003 | Coushaine |
| 6,679,621 B2 | 1/2004 | West et al. |
| 6,682,211 B2 | 1/2004 | English et al. |
| 6,721,101 B2 | 4/2004 | Daniell |
| 6,730,940 B1 | 5/2004 | Steranka et al. |
| 6,808,293 B2 | 10/2004 | Watanabe et al. |
| 6,837,605 B2 | 1/2005 | Reill |
| 6,846,101 B2 | 1/2005 | Coushaine |
| 6,851,835 B2 | 2/2005 | Smith et al. |
| 6,896,381 B2 | 5/2005 | Benitez et al. |
| 6,903,376 B2 | 6/2005 | Shen et al. |
| 6,918,677 B2 | 7/2005 | Shipman |
| 6,924,943 B2 | 8/2005 | Minano et al. |
| 6,929,384 B2 | 8/2005 | Watanabe et al. |
| 6,948,840 B2 | 9/2005 | Grenda et al. |
| 6,955,451 B2 | 10/2005 | Coushaine et al. |
| 6,987,613 B2 | 1/2006 | Pocius et al. |
| 6,991,355 B1 | 1/2006 | Coushaine et al. |
| 6,995,402 B2 | 2/2006 | Ludowise et al. |
| 7,009,213 B2 | 3/2006 | Camras et al. |
| 7,042,021 B2 | 5/2006 | Isoda |
| 7,053,419 B1 | 5/2006 | Camras et al. |
| 7,063,441 B2 | 6/2006 | Kramer et al. |
| 7,063,450 B2 | 6/2006 | Ehara et al. |
| 7,064,355 B2 | 6/2006 | Camras et al. |
| 7,080,932 B2 | 7/2006 | Keuper |
| 7,083,313 B2 | 8/2006 | Smith |
| 7,106,523 B2 | 9/2006 | McLean et al. |
| 7,111,972 B2 | 9/2006 | Coushaine et al. |
| 7,114,838 B2 | 10/2006 | Wu |
| 7,118,236 B2 | 10/2006 | Hahm et al. |
| 7,118,262 B2 | 10/2006 | Negley |
| 7,121,691 B2 | 10/2006 | Coushaine et al. |
| 7,125,143 B2 | 10/2006 | Hacker |
| 7,125,160 B2 | 10/2006 | Wong et al. |
| 7,150,553 B2 | 12/2006 | English et al. |
| 7,153,000 B2 | 12/2006 | Park et al. |
| 7,153,002 B2 | 12/2006 | Kim et al. |
| 7,172,324 B2 | 2/2007 | Wu et al. |
| 7,181,378 B2 | 2/2007 | Benitez et al. |
| 7,182,497 B2 | 2/2007 | Lee et al. |
| 7,246,923 B2 | 7/2007 | Conner |
| 7,246,931 B2 | 7/2007 | Hsieh et al. |
| 7,278,761 B2 | 10/2007 | Kuan |
| 7,348,723 B2 | 3/2008 | Yamaguchi et al. |
| 7,352,011 B2 | 4/2008 | Smits et al. |
| 7,410,275 B2 | 8/2008 | Sommers et al. |
| 7,411,742 B1 | 8/2008 | Kim et al. |
| 7,549,769 B2 | 6/2009 | Kim et al. |
| 7,641,365 B2 * | 1/2010 | Katzir et al. .................. 362/327 |
| 7,674,018 B2 | 3/2010 | Holder et al. |
| 7,766,509 B1 | 8/2010 | Laporte |
| 7,810,968 B1 | 10/2010 | Walker et al. |
| 7,854,536 B2 | 12/2010 | Holder et al. |
| 7,866,837 B2 | 1/2011 | Ho |
| 7,901,098 B2 | 3/2011 | Saitoh et al. |
| 7,922,369 B2 | 4/2011 | Condon et al. |
| 7,942,558 B2 | 5/2011 | Zweig et al. |
| 8,021,027 B2 | 9/2011 | Galipeau et al. |
| 8,197,091 B1 | 6/2012 | Kyle et al. |
| 8,602,617 B2 * | 12/2013 | Cabrera Godoy ............ 362/520 |
| 2002/0191386 A1 | 12/2002 | Cleaver et al. |
| 2004/0037076 A1 | 2/2004 | Katoh et al. |
| 2004/0114355 A1 | 6/2004 | Rizkin |
| 2004/0156209 A1 | 8/2004 | Ishida |
| 2004/0207999 A1 | 10/2004 | Suehiro et al. |
| 2004/0212291 A1 | 10/2004 | Keuper |
| 2005/0073849 A1 | 4/2005 | Rhoads et al. |
| 2005/0083699 A1 | 4/2005 | Rhoads et al. |
| 2005/0179041 A1 | 8/2005 | Harbers et al. |
| 2005/0205878 A1 | 9/2005 | Kan |

(56) References Cited

U.S. PATENT DOCUMENTS

| | | |
|---|---|---|
| 2005/0224826 A1 | 10/2005 | Keuper et al. |
| 2005/0281047 A1 | 12/2005 | Coushaine et al. |
| 2006/0013000 A1 | 1/2006 | Coushaine et al. |
| 2006/0013002 A1 | 1/2006 | Coushaine et al. |
| 2006/0039143 A1 | 2/2006 | Katoh et al. |
| 2006/0083000 A1 | 4/2006 | Yoon et al. |
| 2006/0105482 A1 | 5/2006 | Alferink et al. |
| 2006/0181902 A1 | 8/2006 | Tamura et al. |
| 2006/0186431 A1 | 8/2006 | Miki et al. |
| 2006/0198144 A1 | 9/2006 | Miyairi et al. |
| 2007/0058369 A1 | 3/2007 | Parkyn et al. |
| 2007/0201225 A1 | 8/2007 | Holder et al. |
| 2008/0101063 A1 | 5/2008 | Koike et al. |
| 2008/0205061 A1 | 8/2008 | Holder et al. |
| 2008/0239722 A1 | 10/2008 | Wilcox |
| 2009/0086498 A1 | 4/2009 | Condon et al. |
| 2009/0109670 A1* | 4/2009 | Boyer ................ F16B 5/0258 362/234 |
| 2009/0225543 A1* | 9/2009 | Jacobson et al. ............ 362/247 |
| 2010/0014286 A1 | 1/2010 | Yoneda et al. |
| 2010/0039810 A1 | 2/2010 | Holder et al. |
| 2010/0073927 A1 | 3/2010 | Lewin et al. |
| 2010/0085763 A1 | 4/2010 | Aguglia |
| 2010/0085764 A1 | 4/2010 | Chuang |
| 2010/0091495 A1 | 4/2010 | Patrick |
| 2010/0110660 A1 | 5/2010 | Brukilacchio |
| 2010/0110695 A1 | 5/2010 | Nakamura |
| 2010/0128488 A1 | 5/2010 | Marcoux |
| 2010/0135028 A1 | 6/2010 | Kokubo |
| 2010/0165625 A1 | 7/2010 | Holder et al. |

FOREIGN PATENT DOCUMENTS

| | | |
|---|---|---|
| JP | 60199746 | 10/1985 |
| JP | 61160328 | 7/1986 |
| JP | 8264839 | 10/1996 |
| JP | 2008103300 A | 5/2008 |
| WO | WO2006111805 A1 | 10/2006 |
| WO | WO2007018927 A2 | 2/2007 |
| WO | WO2008144672 A1 | 11/2008 |

OTHER PUBLICATIONS

Sylvania ProPoint Outdoor Luminaires LED Post Top Series brochure. Copyright 2011.
Prestige specification sheet. www.cyclonelighting.com.
Cooper Lighting. McGraw-Edison Generation Series Decorative Post Top Luminaire brochure.

* cited by examiner

LED LIGHTING APPARATUS

RELATED APPLICATION

This application is a continuation-in-part of currently pending U.S. application Ser. No. 12/173,721, filed on Jul. 15, 2008, which is based in part on U.S. Provisional Application Ser. No. 61/055,958, filed May 23, 2008. This application is also based in part on U.S. Provisional Application Ser. No. 61/536,560, filed Sep. 19, 2011. The entire contents of each of application Ser. Nos. 12/173,721, 61/055,958 and 61/536,560 are incorporated herein by reference.

FIELD OF THE INVENTION

The invention relates generally to the field of lighting systems and, more particularly, to apparatus for utilizing LED light sources for illuminating areas with a predefined pattern of light intensity. The present invention also relates to fixtures which utilize LED light sources in retrofitting old fixtures which previously used other non-LED types of light sources such as high-intensity discharge (HID) lamps.

BACKGROUND OF THE INVENTION

LEDs (light-emitting diodes) provide light sources which are energy efficient, and advances in LED technology provide even greater such efficiencies over time. Some typical applications for lighting systems are roadway and parking lot lighting in which there are performance requirements such as the requirement that light be uniformly distributed over areas which are to be lighted while the neighboring regions are to be substantially free of light spillage.

High-luminance light fixtures using LEDs as light source for outdoor applications present particularly challenging problems. High costs due to high complexity becomes a particularly difficult problem when high luminance, reliability, and durability are essential to product success.

Dealing with heat dissipation requirements is still another problem area for high-luminance LED light fixtures. Heat dissipation is difficult in part because high-luminance LED light fixtures typically have many LEDs. Complex structures for LED mounting and heat dissipation have sometimes been deemed necessary, and all of this adds to complexity and cost.

In applications such as retrofitting old HID fixtures and other fixtures with LED light sources, especially decorative luminaries that have a look of a particular architectural style such as "acorn" or "tear drop" light fixtures, it is highly desirable to maintain the overall look of the fixture and old-style appearance of illumination.

SUMMARY OF THE INVENTION

The present invention provides an improved retrofit LED lighting fixture which may include LED lensing providing direction of a majority of light from a light emitter toward a preferential side. The emitter may include a single light-emitting diode (LED) or a plurality of LEDs. Each emitter, regardless of the number of LEDs, has an axis. Such emitters may include an LED package which has a primary lens over the LED(s). In such embodiments, the inventive lens is a secondary lens placed over the primary lens(es).

One embodiment of the lens according to the present invention has an emitter-adjacent base end defining a base plane and forming a light-receiving opening, a refracting inner surface which extends from the base end, a lateral surface positioned radially around the inner surface, and an output surface positioned to receive light from the inner end surface and from the lateral surface such that light exits the lens predominantly in the preferential direction.

In certain embodiments, the light-receiving opening is elongate across a preferential direction and is adapted to receive light from a group of light emitters aligned along the opening.

The refracting inner surface forms a void which may also be elongate across the preferential direction. The void may be formed with a racetrack-shaped inner surrounding surface substantially orthogonal to the base plane and a substantially planar elongate inner end surface configured to direct light from the group of light emitters in the preferential direction.

In certain embodiments, the lateral surface is positioned for receiving light refracted by the racetrack-shaped inner surrounding surface for directing received light predominantly in the preferential direction.

In some embodiments, the lateral surface includes opposed preferential and non-preferential surface portions adjoined by opposed curved portions. In such embodiments, the non-preferential surface portion is at an angle to the base plane which is greater than an angle of the preferential surface portion to the base plane.

Another aspect of the present invention is an LED lighting apparatus comprising a plurality of light emitters each having an emitter axis and a plurality of lenses each positioned over a corresponding light emitter. Each lens is configured for directing light from the corresponding light emitter in a preferential-side off-axial direction with respect to the respective emitter axis. In such embodiments, each lens includes an emitter-adjacent base end forming an opening around the emitter axis and an inner surface extending from the opening. The inner surface defines a void terminating with an end surface which is configured to direct light from the emitter toward the preferential side. The end surface may have a substantially planar portion and may extend from the preferential side away from the base end and across from the preferential side. Each lens also includes a lateral surface radially beyond the void and configured for directing light received from the inner surface toward the preferential side. An output-end surface is positioned to receive light from the inner surface and from the lateral surface. Such light from the emitter exits the output-end surface predominantly toward the preferential side.

In certain embodiments, the lateral surface of each lens extends from the base end to terminate proximal to the output-end surface at distances from the emitter axis which are greater on the preferential side than on the non-preferential side.

Another aspect of this invention may be useful for retrofit LED light fixtures. Such embodiments of the invention include a plurality of LED emitters and utilize an LED lensing configured to imitate the appearance of a single-light source such as an HID or other light bulb. In this aspect of the invention, improved LED lensing for an LED array facilitates achievement of the appearance of a single-light source, such as an HID or other light bulb. In some of such embodiments, the LED lensing is a unitary lens comprising a plurality of lens members aligned substantially along a preferential/non-preferential line, each lens member being elongate across the preferential/non-preferential line with all elongate lens members being in substantially the same orientation.

The term "preferential/non-preferential line," as used herein, means a line that extends through opposed preferential-side and non-preferential-side end points of the unitary lens. When the unitary lens is utilized in retrofit LED fixtures such as those referred to as "acorn" post-top light fixtures or "tear drop" fixtures, the preferential/non-preferential line would be substantially vertical with the preferential-side end point being at the bottom of the unitary LED lens. In light fixtures of this kind, LED light would be directed primarily outwardly and downwardly to increase illumination of ground areas along which these light fixtures are installed and to minimize wasteful uplight.

Some embodiments of such lensing include an emitter-adjacent base end defining a base plane and forming a light-receiving opening which is elongate across the preferential/non-preferential line and is adapted to receive light from a group of light emitters aligned along the opening. A refracting inner surface forms a void which is elongate across the preferential/non-preferential line and has a racetrack-shaped surrounding surface extending from the base end substantially orthogonally to the base plane to terminate at a substantially planar elongate end surface configured to direct light from the emitters toward the preferential side. A lateral surface is positioned for receiving light refracted by the racetrack-shaped inner surrounding surface and has opposed preferential and non-preferential surface portions, the non-preferential portion being at an angle to the base plane which is greater than the angle of the preferential portion to the base plane. An output surface is positioned to receive light from the inner end surface and from the lateral surface such that light exits the lens member predominantly toward the preferential side, whereby light exits the unitary lens predominantly toward the preferential side.

In certain embodiments, the unitary lens has a substantially flat outer face substantially parallel to the base plane. The aligned elongate lens members may be positioned with no more than a minimal gap therebetween. In such embodiments, the aligned elongate lens members are positioned such that the unitary lens has substantially continuous light emission across the group of aligned elongate lens members to form a substantially uninterrupted light field to an observer facing the unitary lens.

The term "minimal gap," as used herein, means the shortest distance between the lens members along the preferential/non-preferential line, such distance being no greater than about one fifth of a greatest lens-member dimension along the preferential/non-preferential line. The minimal gap may range from about five millimeters in some embodiments with a smaller greatest lens-member dimension along the preferential/non-preferential line to about one millimeter in some other embodiments. In yet other embodiments, there may be substantially no gap between the lens members which have an outermost edge contacting the outermost edge of the adjacent lens member.

A certain aspect of the present invention involves an LED lighting apparatus which has a plurality of LED light sources spaced along an elongate mounting board, each LED light source including a group of LED emitters aligned substantially perpendicular to the mounting-board length.

Such LED apparatus includes a plurality of lens members in a line adjacent to one another and each positioned over a corresponding LED light source. Each lens member is elongate in a direction substantially perpendicular to the line and directing light from its corresponding LED light source such that light from the plurality of LED light sources emanates substantially uniformly across the width and along the line of the lens members, thereby generating a substantially uniform luminance from the plurality of lens members.

In certain embodiments of the inventive LED lighting apparatus, the mounting board is substantially planar and the plurality of LED light sources have respective emission axes which are substantially parallel to one another and are substantially perpendicular to the mounting board. In some of such embodiments, the lens members direct light from the LED light sources in a primarily off-axial direction.

In some of such embodiments of the LED lighting apparatus, the mounting-board length extends between opposite preferential and non-preferential sides; and the lens members direct light from the LED light sources primarily toward the preferential side.

Each lens member may have a lens portion and a flange thereabout. In certain embodiments, the flange portions of the plurality of lens members are molded together forming a unified flange portion with the lens portions extending therefrom.

Each lens portion may include an emitter-adjacent base end forming an opening around a corresponding emission axis. An inner surface extends from the opening and defines a void terminating with an end surface. In certain embodiments, the end surface extends from the preferential side away from the base end toward the non-preferential side which is across from the preferential side thereby directing light from the corresponding LED light source toward the preferential side. A total internal reflection (TIR) surface is positioned radially beyond the void and directs light received from the inner surface toward the preferential side. An outer output surface receives light from the inner end surface and the TIR surface, such light exiting the output surface predominantly toward the preferential side.

The lens-portion opening may be elongate in the direction substantially perpendicular to the line of the lens members. The inner surface may include a surrounding lateral surface extending from the opening to the end surface substantially orthogonally to the base plane. The end surface may be substantially planar and elongate in the direction substantially perpendicular to the line of the lens members.

In some embodiments, the TIR surface extends from the emitter-adjacent base end to a racetrack-shaped edge distal from the base plane. In some embodiments, the distal edge has a substantially-straight edge portion on the preferential side.

The outer output surface is substantially planar. In some embodiments, the mounting board is substantially planar. In such embodiments, the outer output surface is substantially parallel to the mounting board. In certain versions of the LED lighting apparatus, the flange portion of each of the lens members has an outer surface coplanar with the outer output surface of the corresponding lens member. In some of such versions, the plurality of lens members are parts of a single lens piece with the flange portions of the plurality of lens members being molded together forming a unified flange portion of the single lens piece. Such single lens piece has an outer wall which includes the outer output surfaces and the unified flange portion.

In some embodiments, each LED light source includes at least one primary lens. In such embodiments, the corresponding lens member is a secondary lens placed over the at least one primary lens. Each LED emitter may be an LED package having a primary lens over at least one LED.

In descriptions of this invention, including in the claims below, the terms "comprising," "including" and "having" (each in their various forms) and the term "with" are each to be understood as being open-ended, rather than limiting, terms.

DETAILED DESCRIPTION OF ILLUSTRATED EMBODIMENTS

Figure 1:
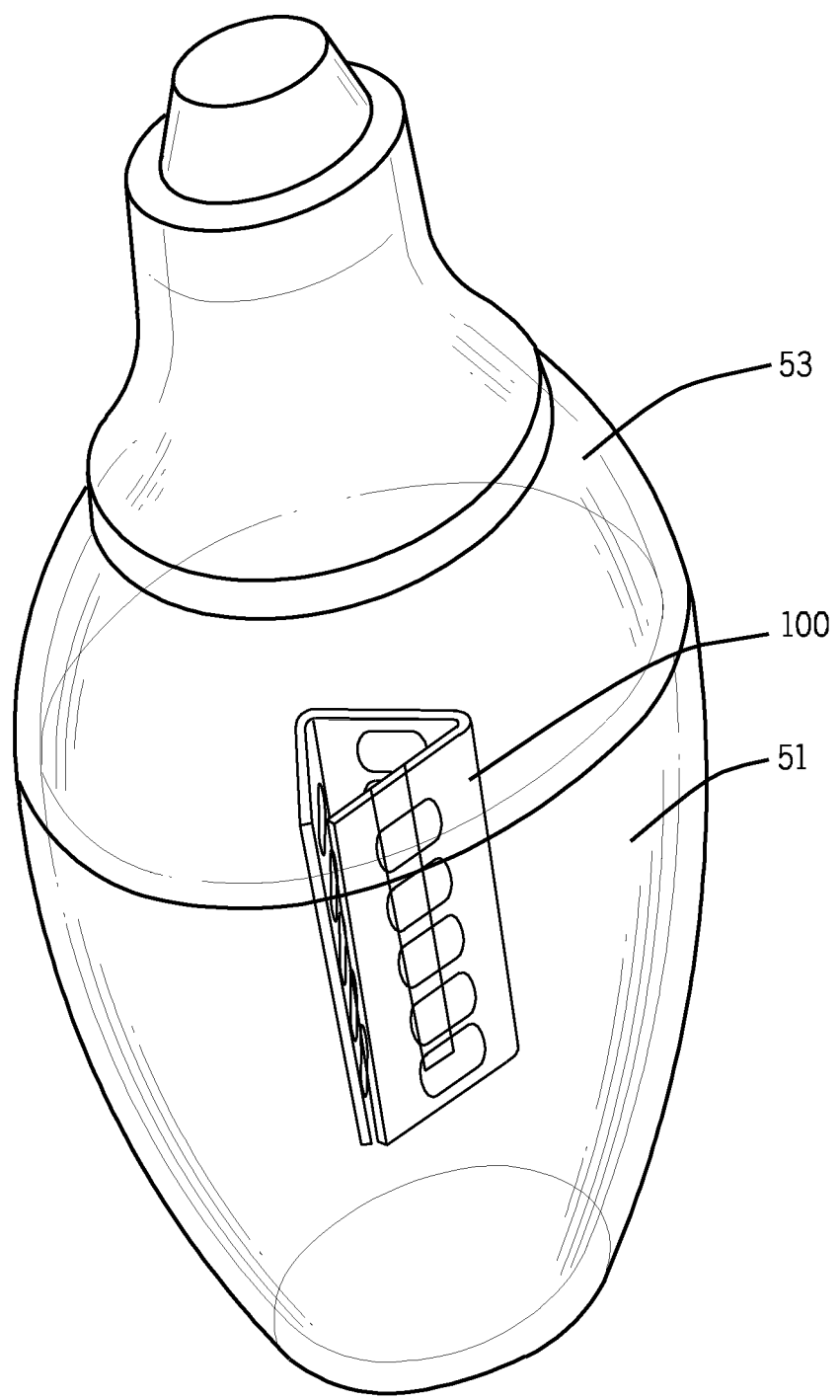
FIG. 1 is a perspective view showing an inventive LED configuration inside an old style globe-type lens for an "acorn" fixture.
Figure 60:
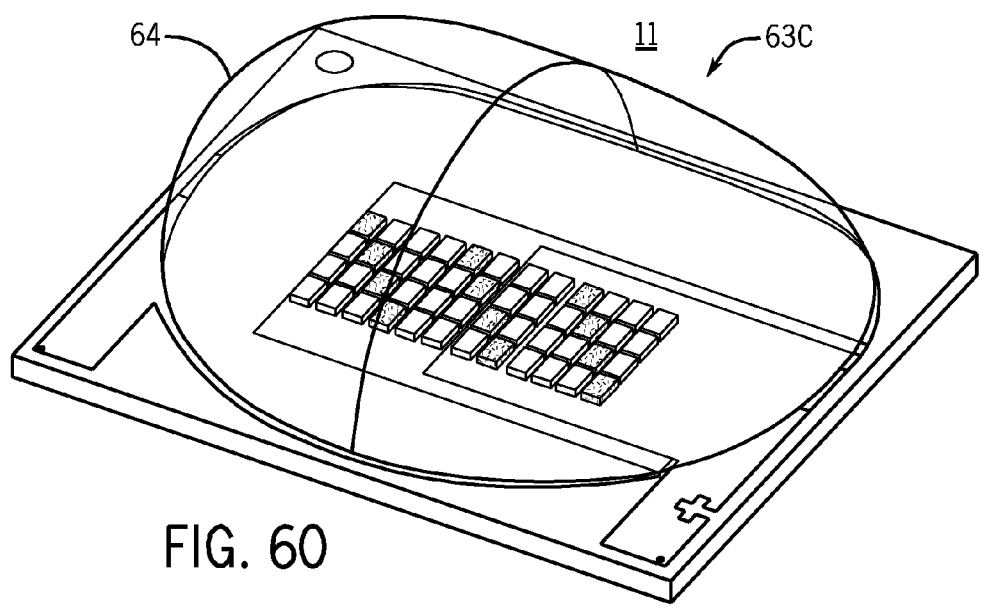
FIG. 60 is an enlarged perspective view of another example of an LED package and including an array of forty-eight LEDs on a submount and an asymmetric primary lens overmolded over the LED array.

The present invention illustrated in FIGS. 1-60 provides an improved LED lensing 10 that may be used for retrofit LED lighting fixture 50. Illustrated embodiments of lensing 10 provide direction of a majority of light from a light source 60 toward a preferential side 11. An example of light source 60 is seen in FIGS. 22-24 and 34. Each LED light source 60 is shown to have a pair of LED emitters 61 each having an axis 62 seen in FIG. 33. Each illustrated LED emitter 61 is an LED package 63 having a primary lens 64 over at least one LED 65.

Figure 55:
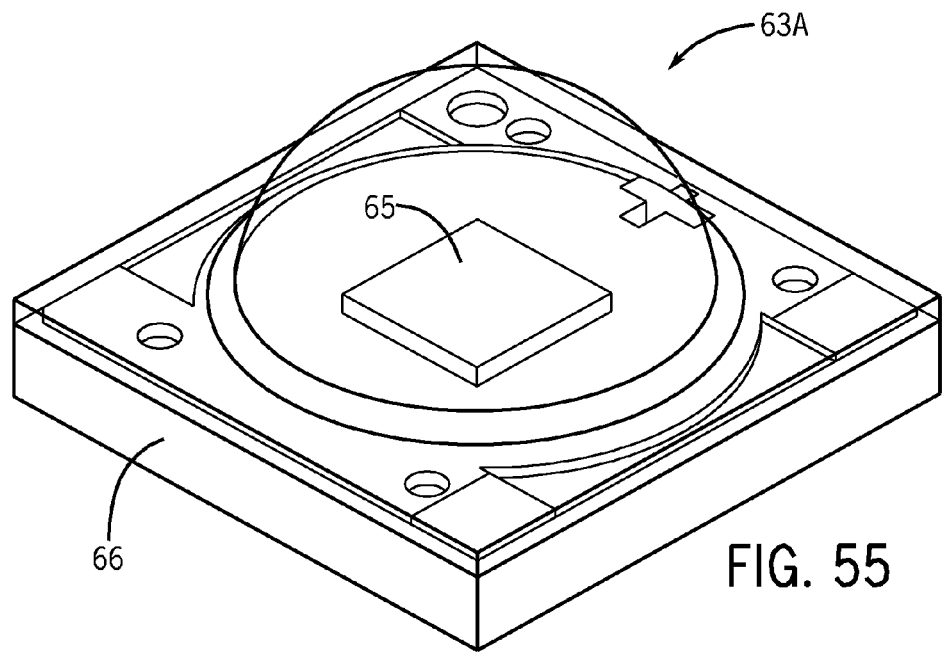
FIG. 55 is an enlarged perspective of an example of an LED package which has a single LED on a submount with a hemispheric primary lens overmolded over the LED.
Figure 56:
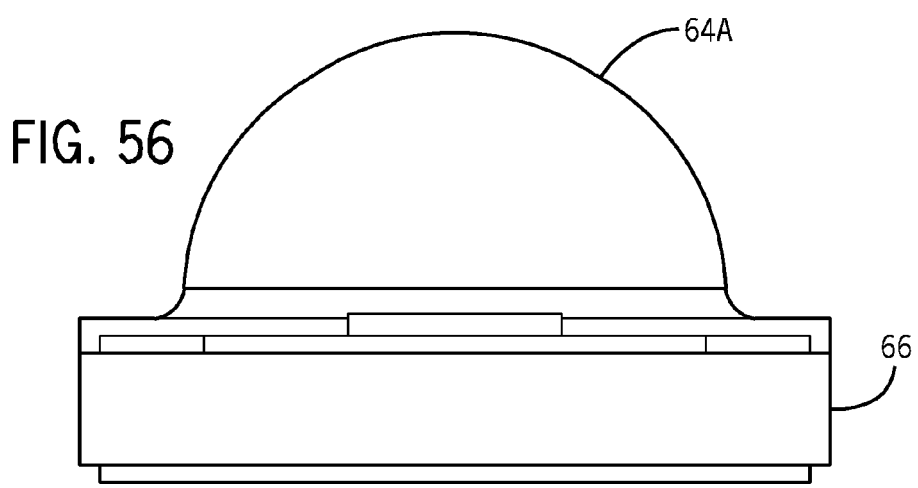
FIG. 56 is an enlarged side view of the LED package of FIG. 55.
Figure 57:
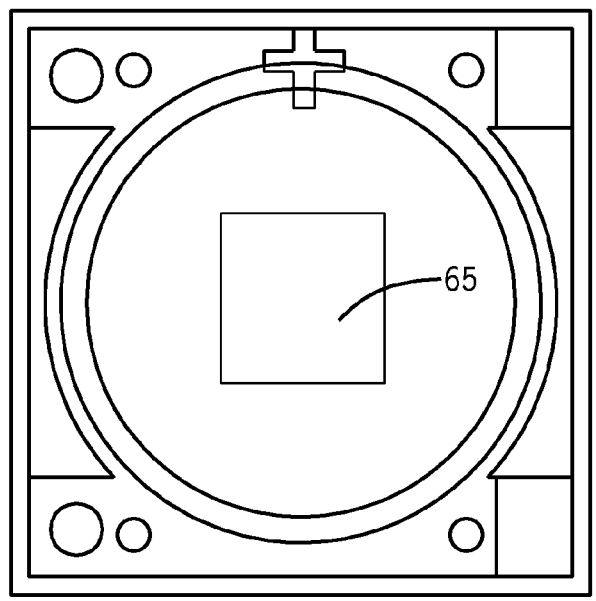
FIG. 57 is an enlarged top view of the LED package of FIG. 55.
Figure 58:
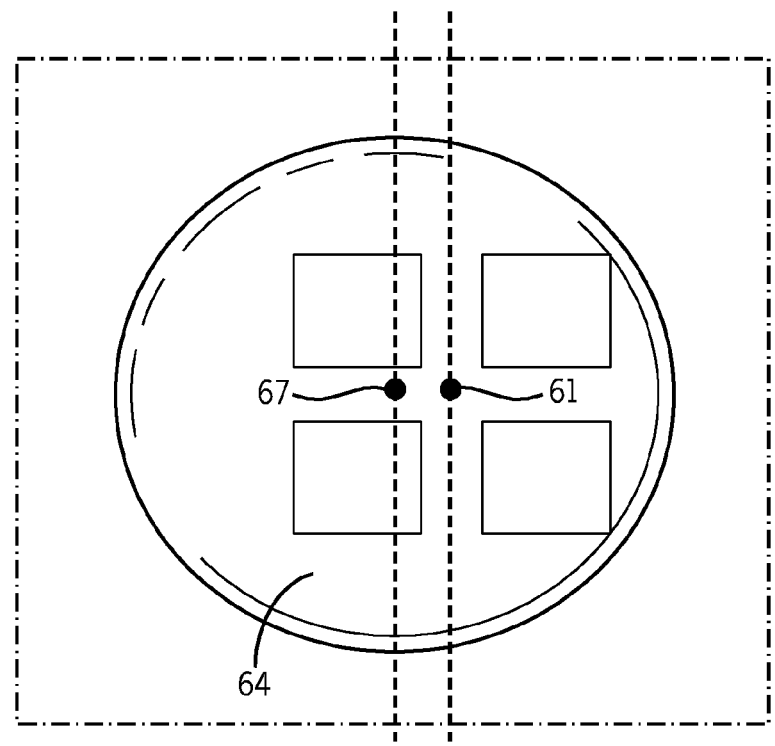
FIG. 58 is an enlarged top view of another exemplary LED package including an array of four LEDs on a submount and a hemispheric primary lens overmolded over the LED array such that the axis of the primary lens is offset from the axis of the LED array.
Figure 59:
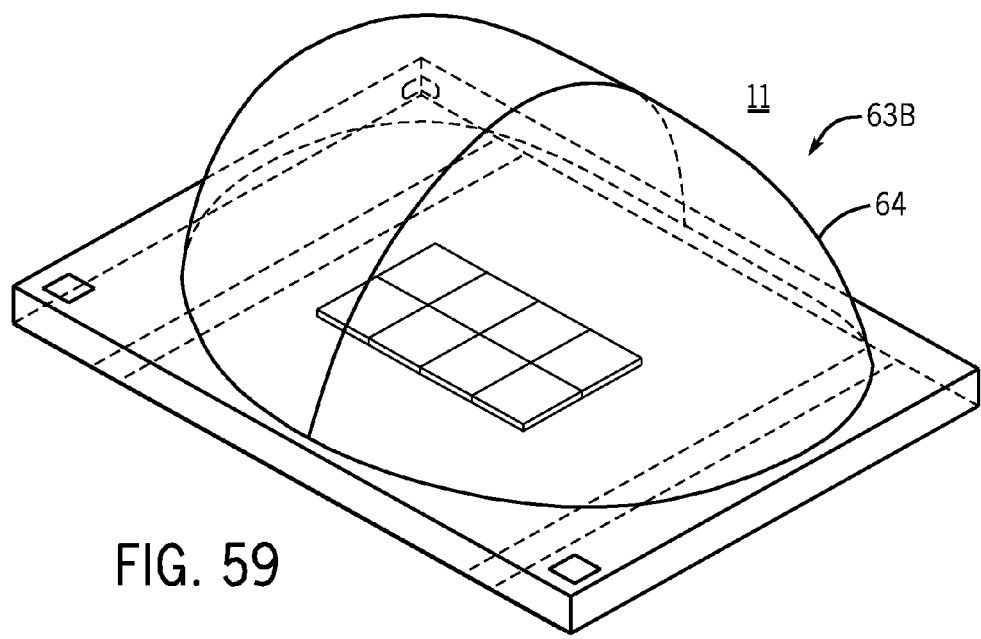
FIG. 59 is an enlarged perspective view of yet another example of an LED package including an array of eight LEDs on a submount and an asymmetric primary lens overmolded over the LED array.

FIGS. 55-60 show examples of LED emitters that may be used with the present invention. FIGS. 55-57 show LED package 63A with single LED 65 on a submount 66 and hemispheric primary lens 64A coaxially overmolded on submount 66 over LED 65. FIGS. 59 and 60 illustrate exemplary LED packages 63B and 63C each including an array of LEDs on an LED-populated area which has an aspect ratio greater than 1, and primary lens 64 being overmolded on the submount 66 over the LED-populated area. It is seen in FIG. 60 that the array may include LEDs emitting different-wavelength light of different colors such as including red LEDs along with light green or other colors to achieve natural white light. Light emitters of the type as LED packages 63B and 63C are described in detail in application Ser. No. 13/441,558, filed on Apr. 6, 2012, and in application Ser. No. 13/441,620, filed on Apr. 6, 2012. Contents of both applications are incorporated herein by reference in their entirety.

FIGS. 58-60 illustrate versions of LED light emitter 61 configured to refract LED-emitted light toward the preferential side. In each of these LED packages, each LED array defines emitter axis 62. FIGS. 59 and 60 illustrate primary lens configured to refract LED-emitted light toward preferential side 11. FIG. 58 shows a hemispheric primary lens 64 having a centerline 67 offset from emitter axis 61. It should be understood that for higher efficiency LED emitter 61 may include a primary lens having both its centerline offset from the emitter axis and also being shaped for refraction of LED-emitted light toward preferential side 11. In FIGS. 59 and 60, primary lens 64 is shown asymmetric.

FIGS. 24, 30, 33, 34 and 38 best illustrate LED lighting apparatus 100 which has a plurality of LED light sources 60 spaced along an elongate mounting board 12, each LED light source 60 including a group of LED emitters 61 aligned substantially perpendicular to the mounting-board length 13.

Figure 2:
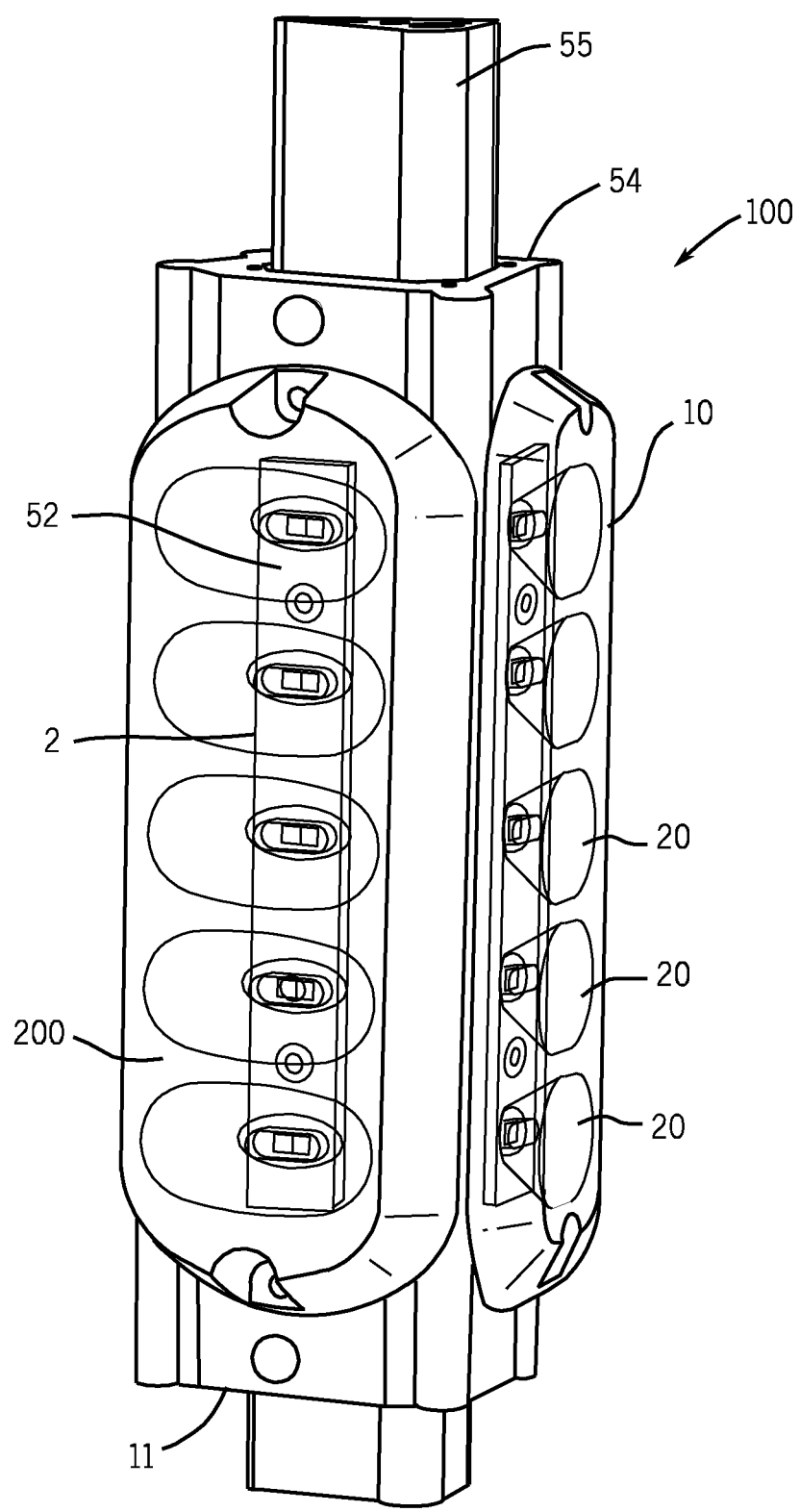
FIG. 2 is a perspective view of an inventive LED arrangement which includes the LED configuration of FIG. 1.
Figure 5:
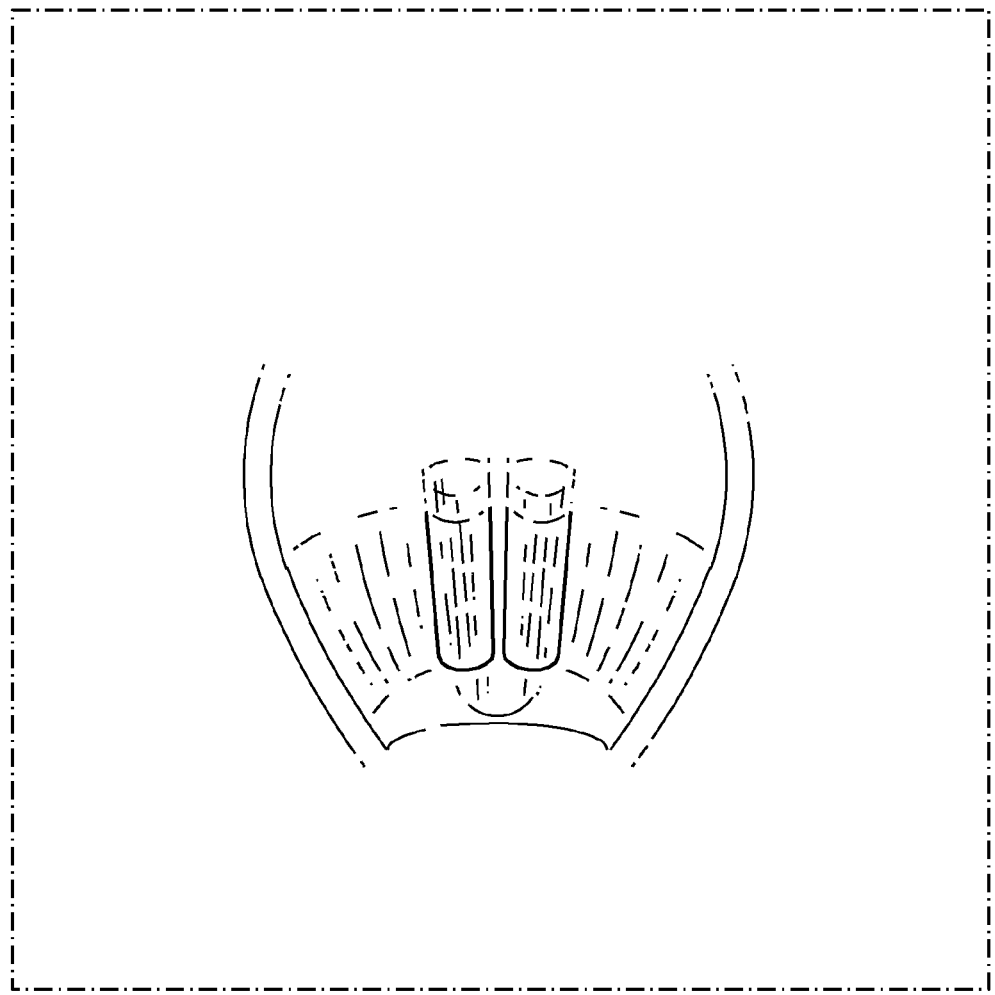
FIG. 5 is a perspective view showing a luminance view of the retrofit LED light fixture incorporating the LED arrangement according to the present invention.
Figure 6:
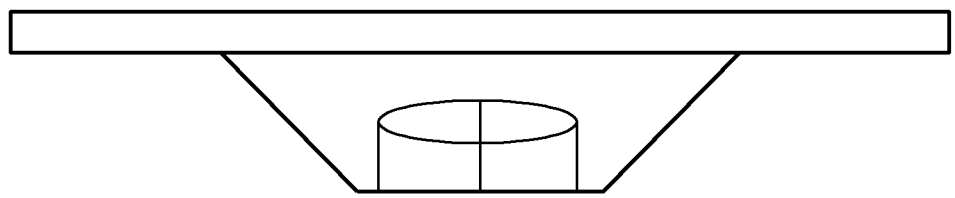
FIG. 6 is a side view of an embodiment of the inventive LED lens.
Figure 24:
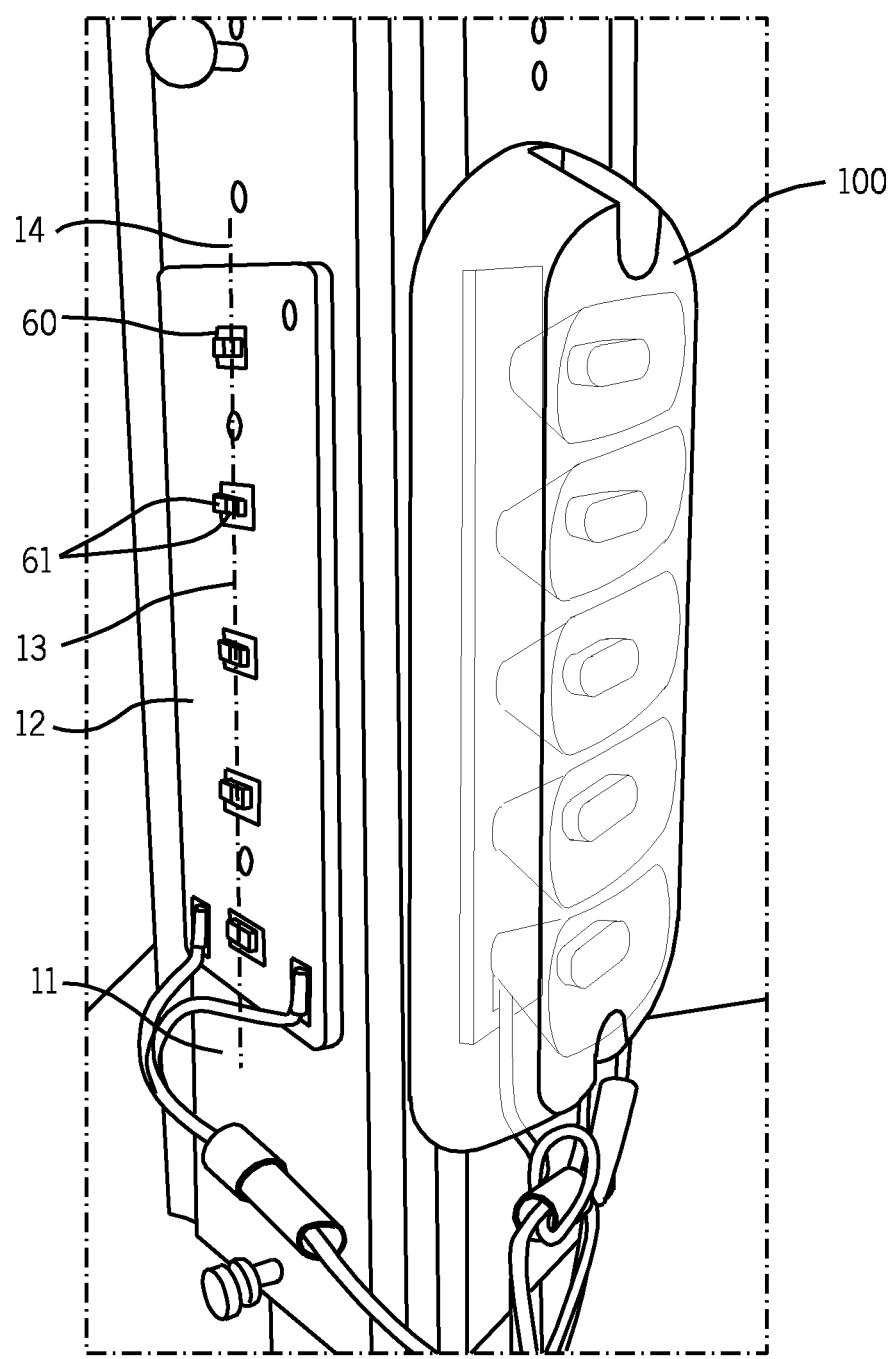
Figure 25:
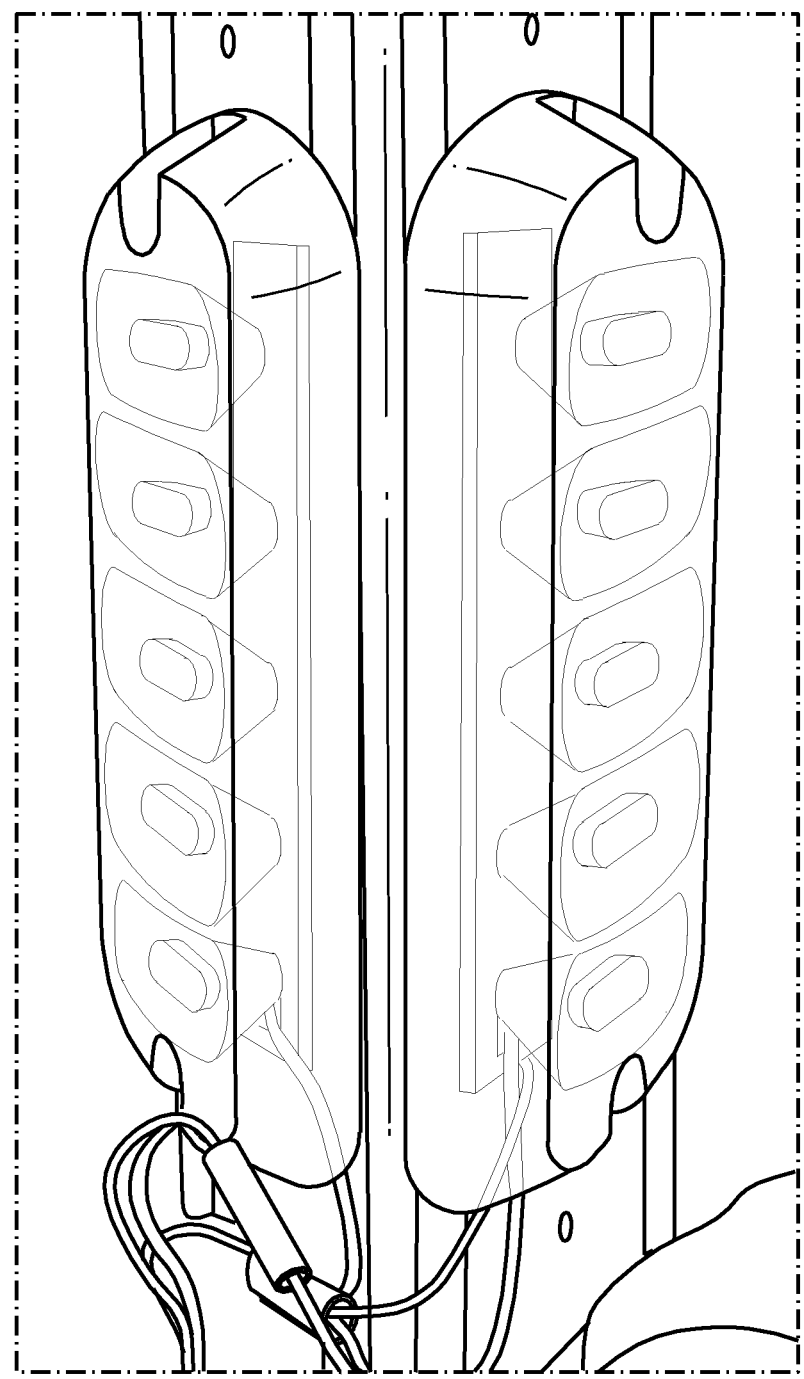
Figure 33:
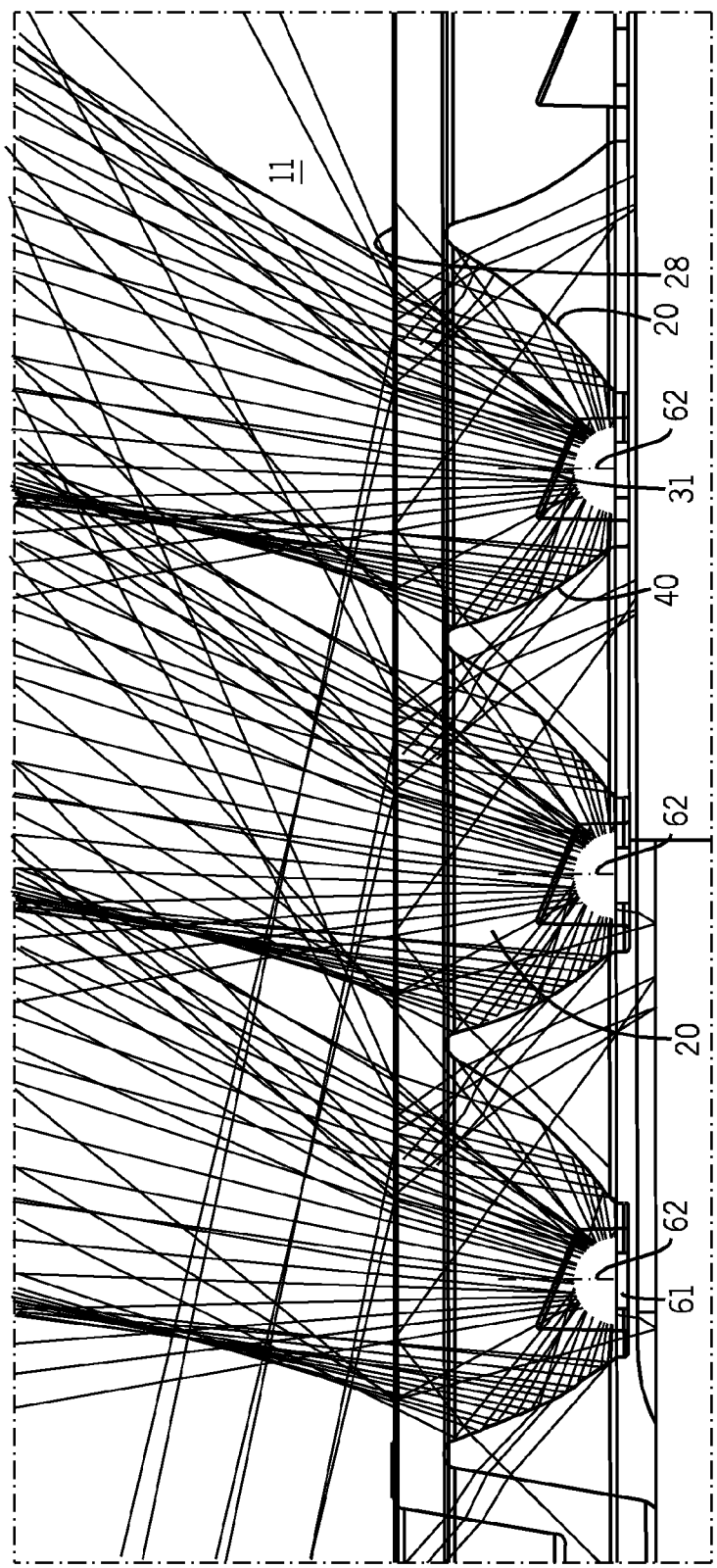
FIG. 33 is an enlarged fragmentary cross-sectional view with a ray trace of an embodiment of the LED lighting apparatus according to the present invention.

FIGS. 2 and 24 illustrate LED apparatus 100 which includes a plurality of secondary lens members 20 in a line along a preferential/non-preferential line 2, lenses 20 being adjacent to one another and each positioned over primary lens(es) 64 of the corresponding LED light source 60. As best seen in FIG. 2, each lens member 20 is elongate in a direction substantially perpendicular to line 2. FIGS. 5 and 33 best illustrate lens members 20 directing light from its corresponding LED light source 60 such that light from the plurality of LED light sources 60 emanates substantially uniformly across the width of the lens members and along line 2, thereby generating a substantially uniform luminance from the plurality of lens members 20.

Figure 22:
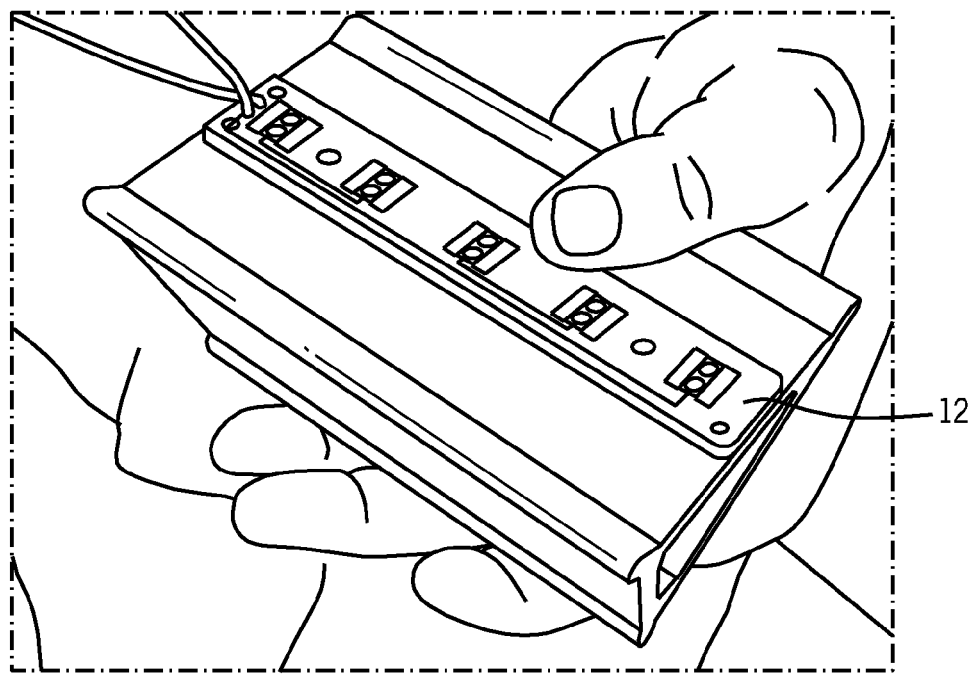
Figure 23:
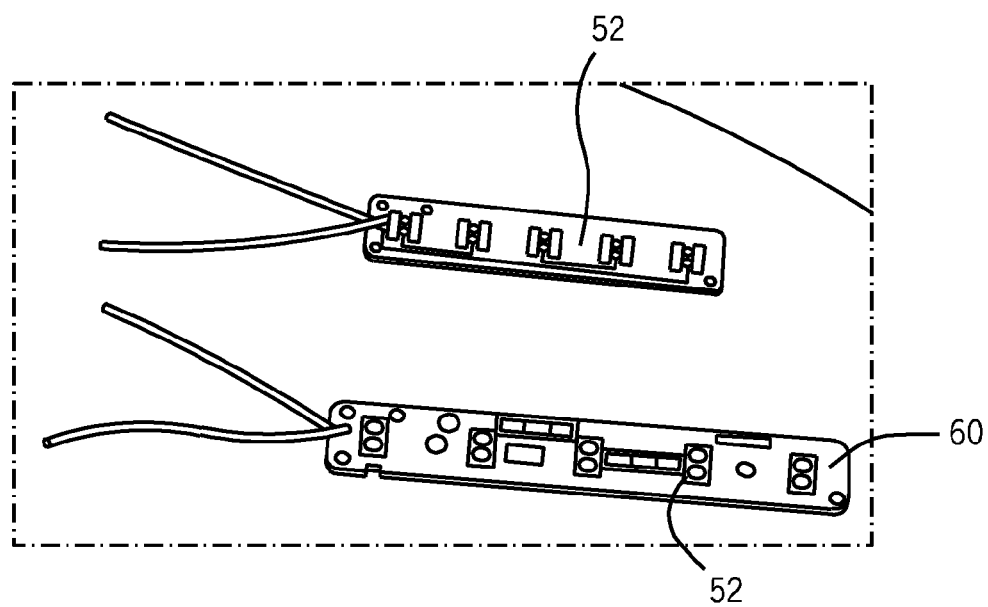

FIGS. 22-24 show mounting board 12 substantially planar and FIG. 33 illustrates the plurality of LED light sources 60 having respective emission axes 61 which are substantially parallel to one another and are substantially perpendicular to the mounting board 12. FIGS. 22-24 further show mounting-board length 13 extending between preferential side 11 and an opposed non-preferential side 14. FIG. 33 further shows lens members 20 directing light from LED light sources 60 in a primarily off-axial direction and primarily toward preferential side 11.

Figure 44:
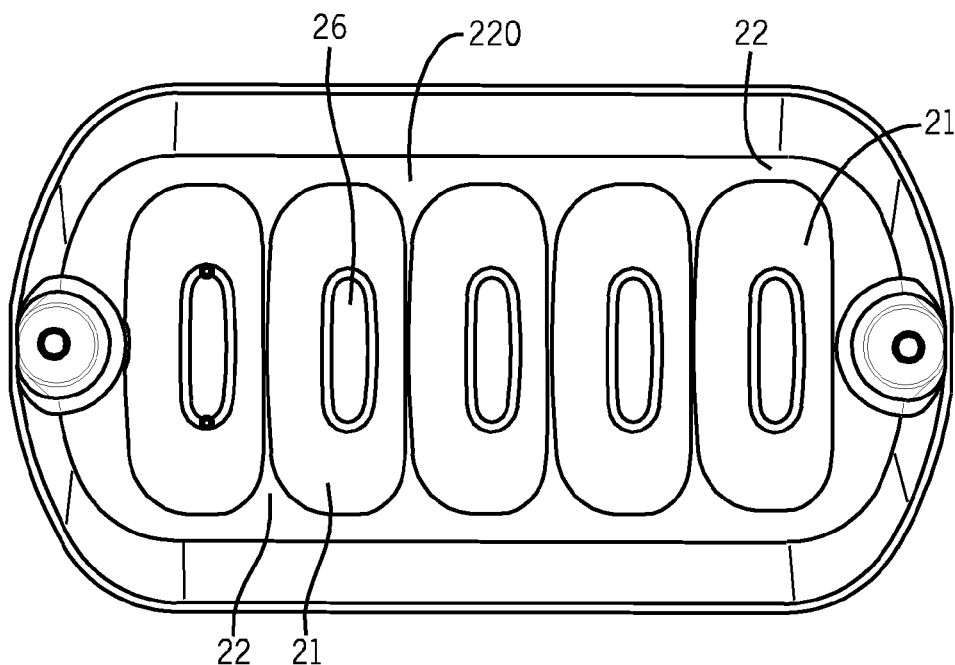
FIG. 44 is a back elevation of the single lens piece of FIG. 39.
Figure 45:
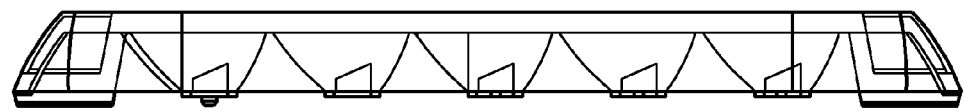
FIG. 45 is a lateral view of the single lens piece of FIG. 39.
Figure 46:
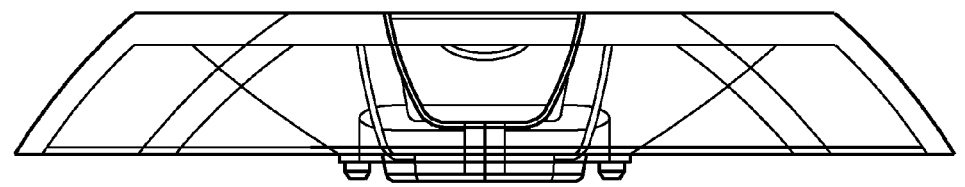
FIG. 46 is a side view of the single lens piece of FIG. 39.

FIG. 44 shows each lens member 20 having a lens portion 21 and a flange portion 22 thereabout. FIGS. 2, 33 and 39-54 illustrate flange portions 22 of the plurality of lens members 20 molded together forming a unified flange portion 220 with lens portions 22 extending therefrom.

Figure 34:
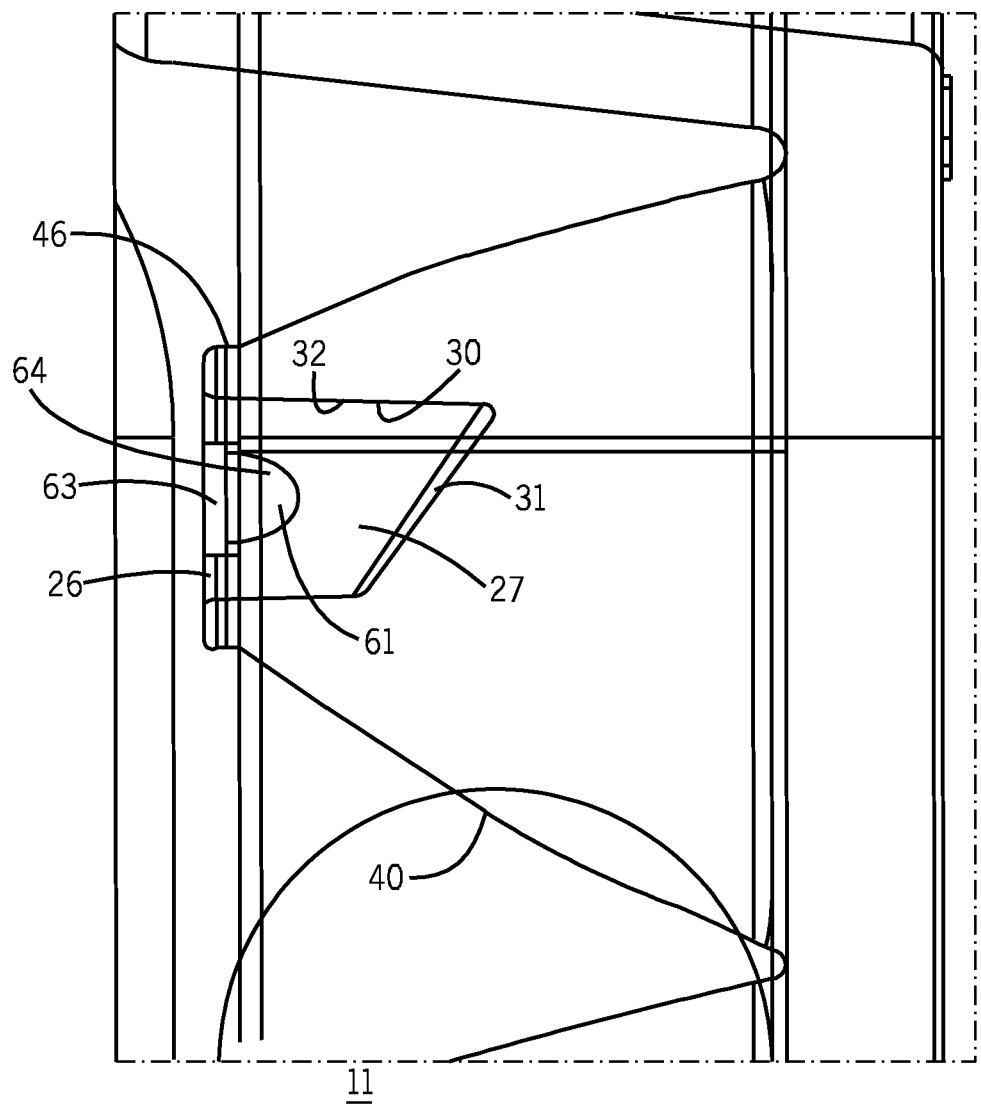
FIG. 34 is a further enlarged fragmentary cross-sectional view of a version of the embodiment of FIG. 33.
Figure 35:
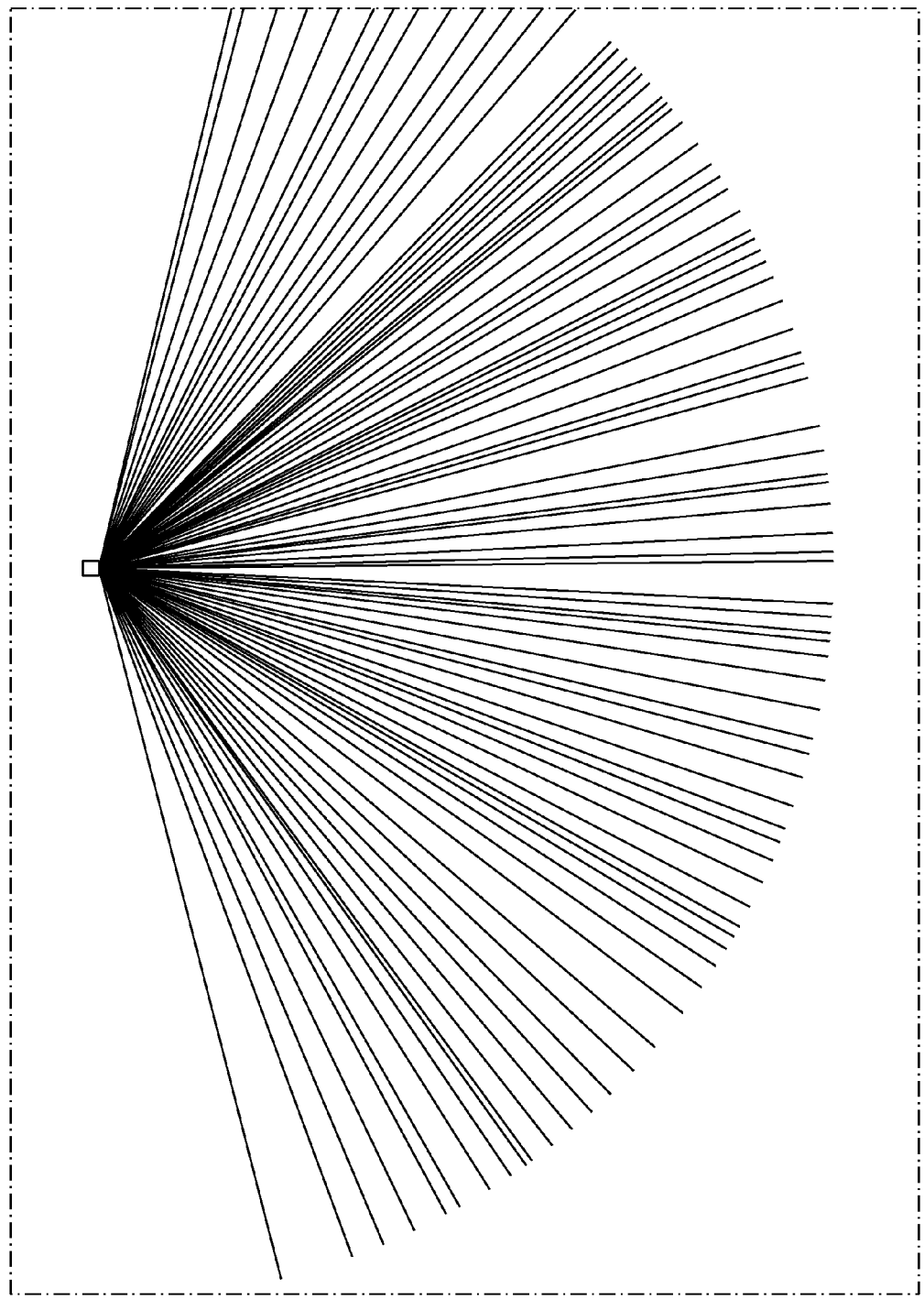
FIG. 35 is a schematic top ray trace of an embodiment of the lens according to the present invention.
Figure 36:
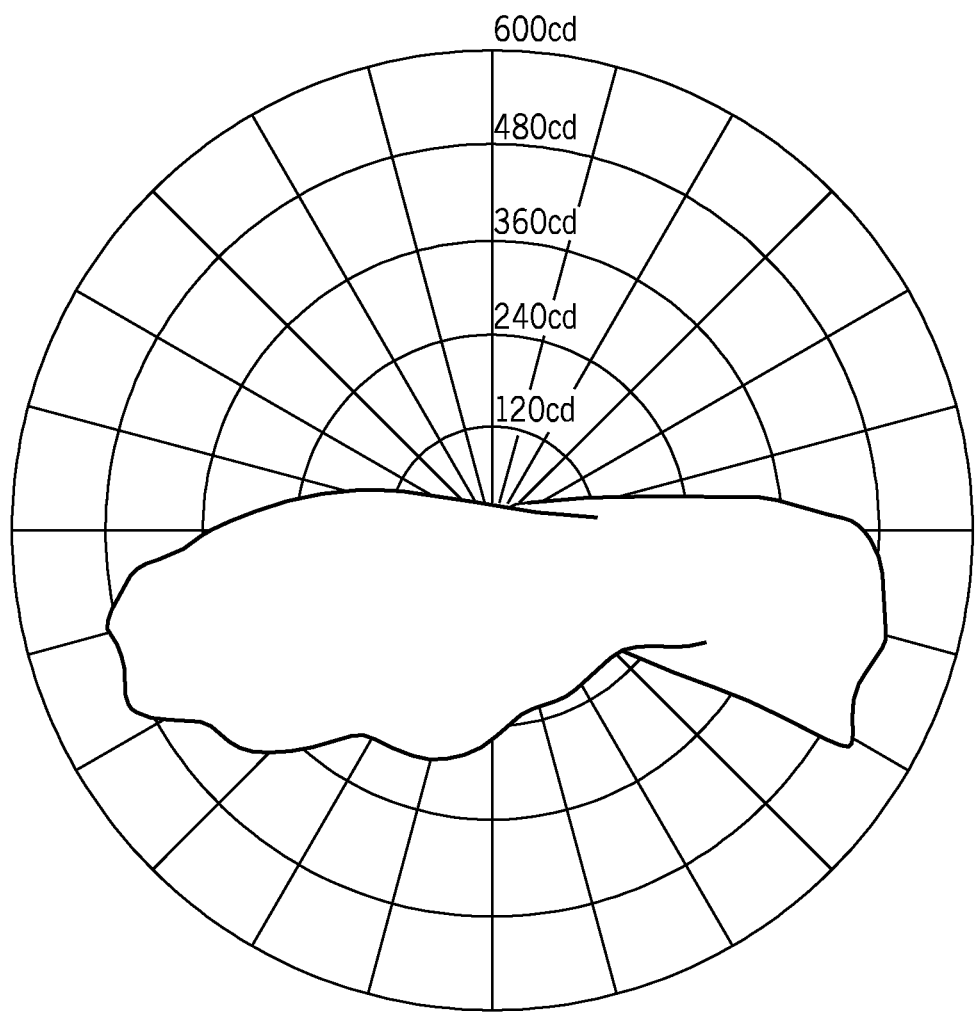
FIG. 36 is a front iso view showing preferential light distribution with minimized up light.
Figure 37:
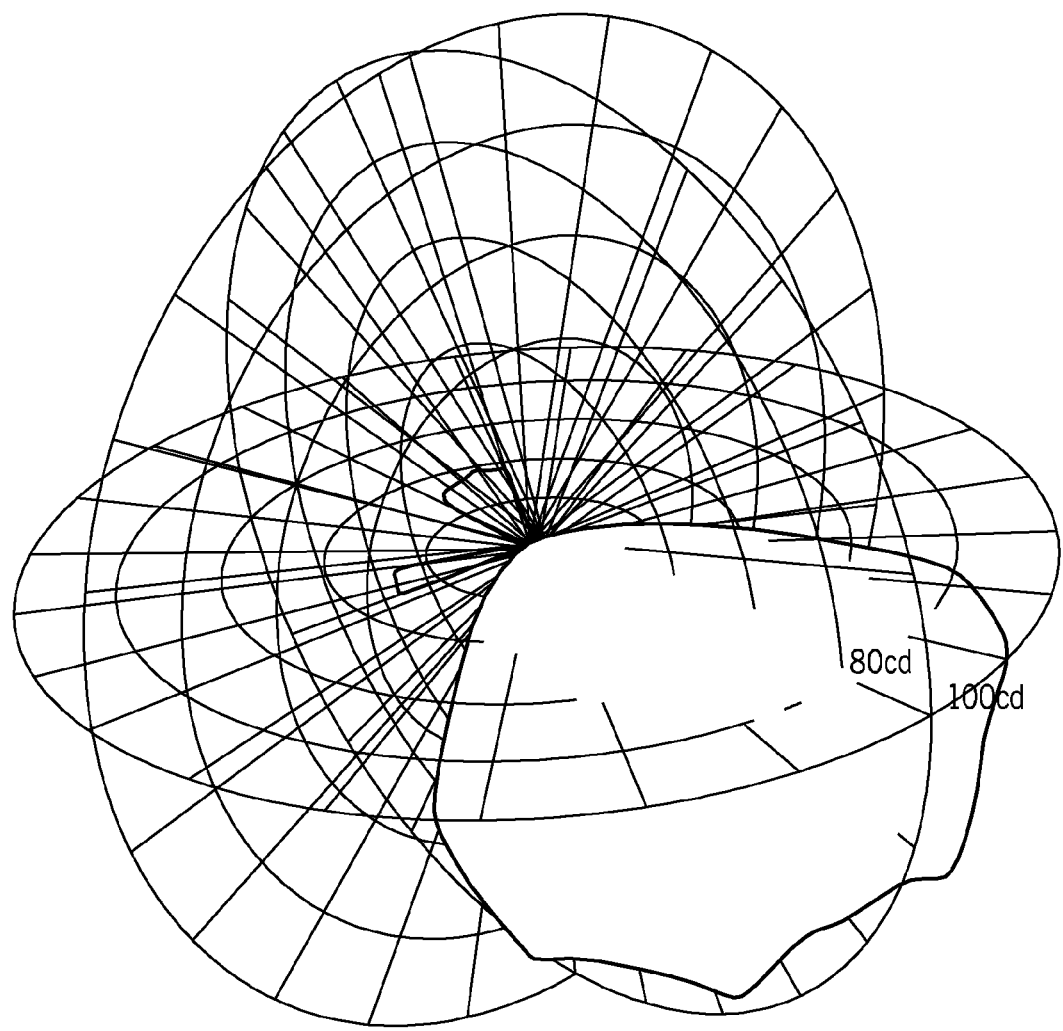
FIG. 37 is a 3-dimensional iso view showing preferential light distribution with minimized up light.
Figure 53:
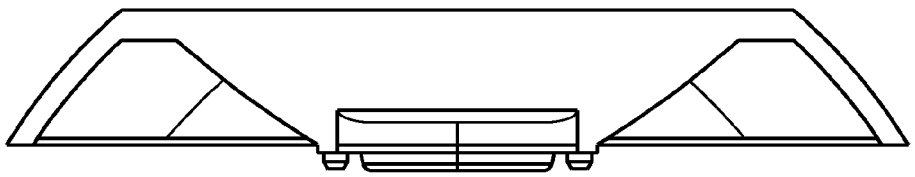
FIG. 53 is a cross-sectional view of the single lens piece, as shown in FIG. 49, taken along a preferential/non-preferential line.
Figure 54:
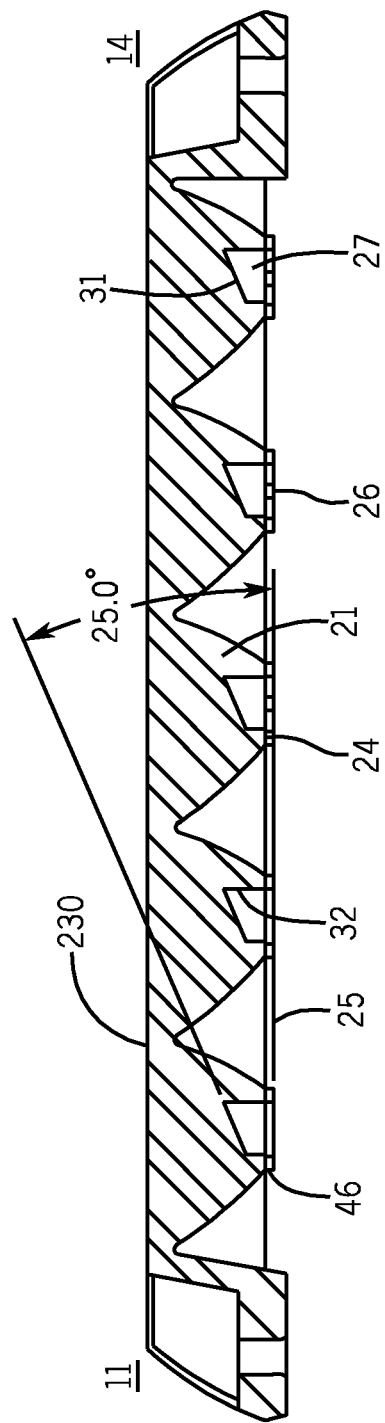
FIG. 54 is a side cross-sectional view of the single lens piece, as shown in FIG. 49, taken across preferential/non-preferential line.

FIGS. 34, 45-48, 53 and 54 show each lens portion 21 including an emitter-adjacent base end 24 which defines a base plane 25 and forms an opening 26 around a corresponding emission axis 61. These FIGURES further show an inner surface 30 extending from opening 26 and defining a void 27 terminating with an end surface 31. FIGS. 34 and 54 best illustrate end surface 31 extending from preferential side 11 away from base end 24 toward non-preferential side 14 which is across from preferential side 11 such that end surface 31 directs light from the corresponding LED light source 60 toward preferential side 11, as seen in FIG. 33. FIG. 54 shows end surface 31 extending at a 25° angle with respect to base plane 25.

FIGS. 34, 39, 48, 53 and 54 also show inner surface 30 including a surrounding lateral surface 32 extending from opening 26 to end surface 31 substantially orthogonally to base plane 25. As seen in FIG. 54, the inner surrounding surface 32 may have a slight inward angle of about 5° toward emitter axis 62 from being fully orthogonal with respect to base plane 25.

Figure 30:
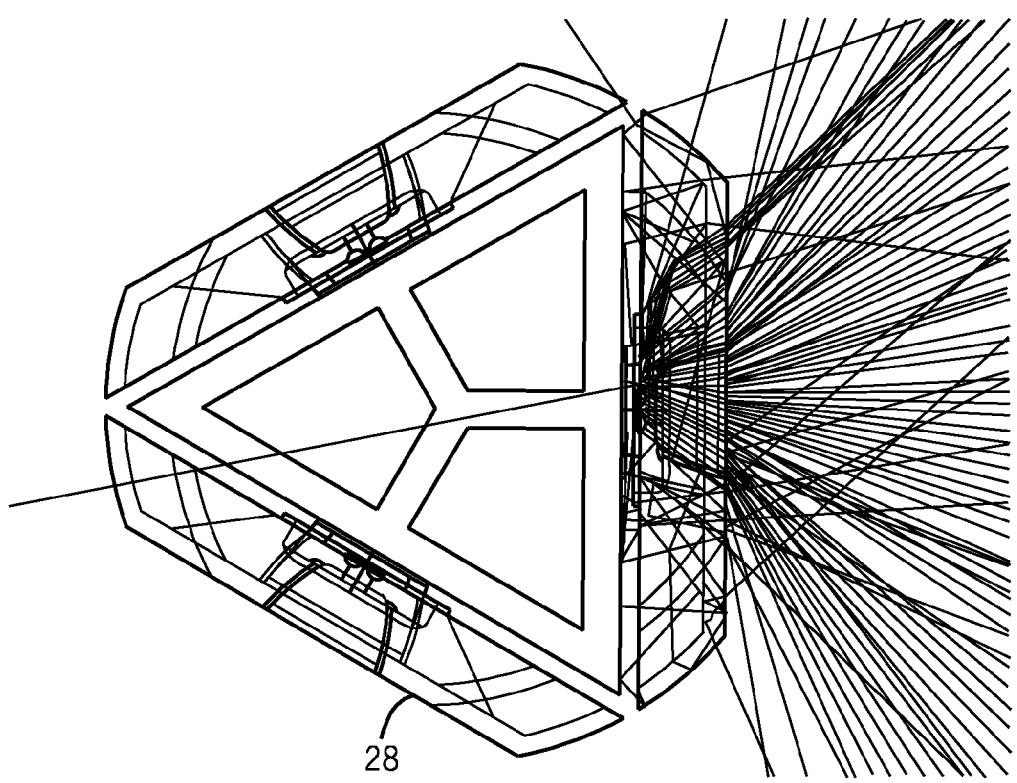
FIG. 30 is a horizontal cross-section view of the LED arrangement of FIG. 16 with a ray trace of an embodiment of the elongate lens according to the present invention.
Figure 47:
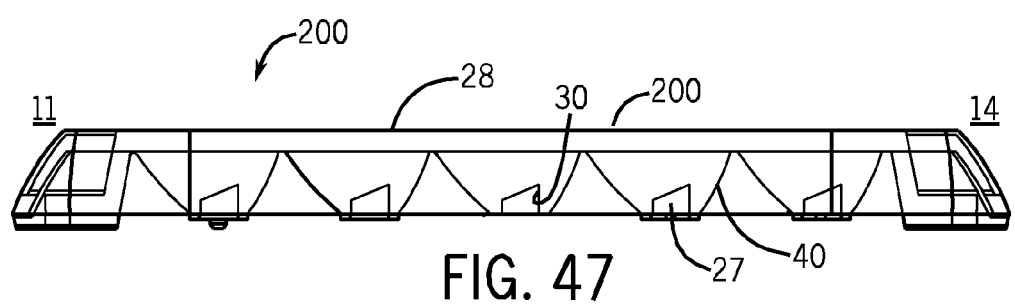
FIG. 47 is a cross-sectional view of the single lens piece along a preferential/non-preferential line.
Figure 48:
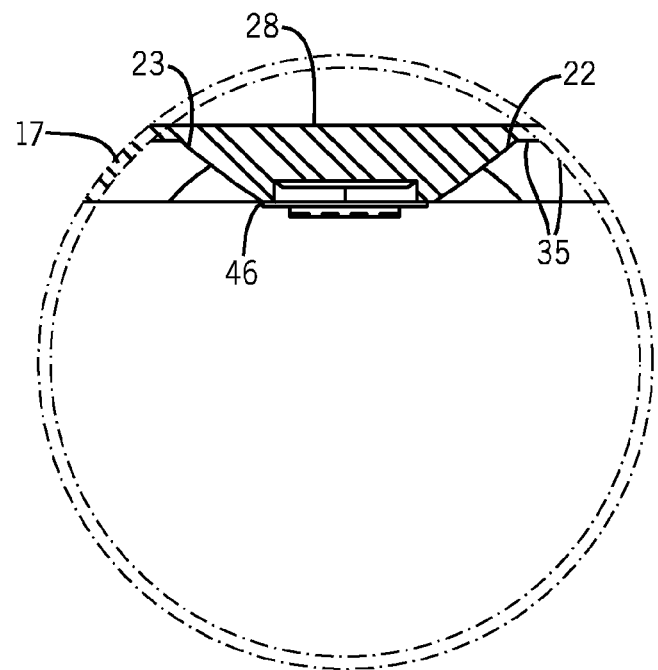
FIG. 48 is a side cross-sectional view of the single lens piece taken across preferential/non-preferential line.
Figure 49:
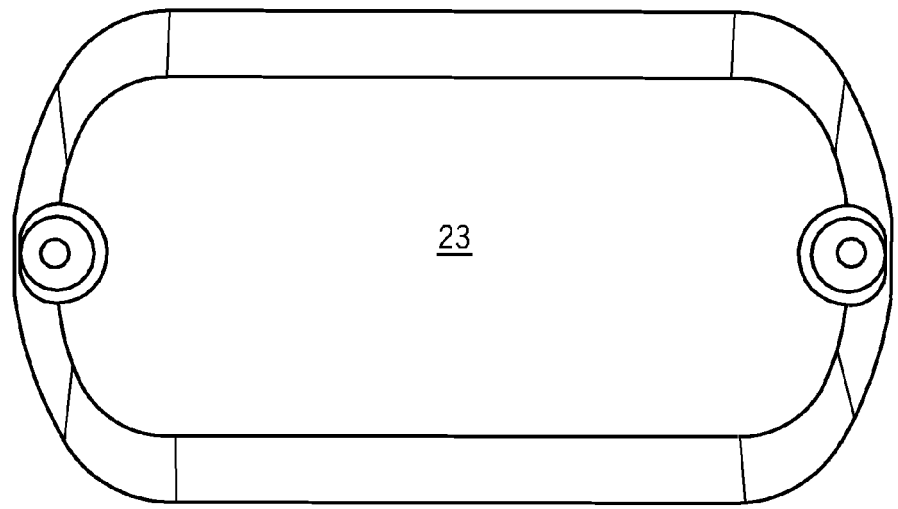
FIG. 49 is a front elevation of the single lens piece of FIG. 39 shown opaque.

FIGS. 34, 38-40, 42-48 and 54 further best show a total internal reflection (TIR) surface 40 (also referred to herein as a lateral surface) positioned radially beyond void 27. FIGS. 30 and 33 show TIR surface 40 receiving light from inner surface 30. FIG. 33 further shows TIR surface 40 directing such light toward preferential side 11. FIGS. 48 and 54 show lateral surface 40 having a base-adjacent region 46 which extends from base 24 substantially orthogonally with a slight outward angle of about 5° away from emitter axis 61 from being fully orthogonal with respect to base plane 25, as seen in FIG. 54.

Figure 40:
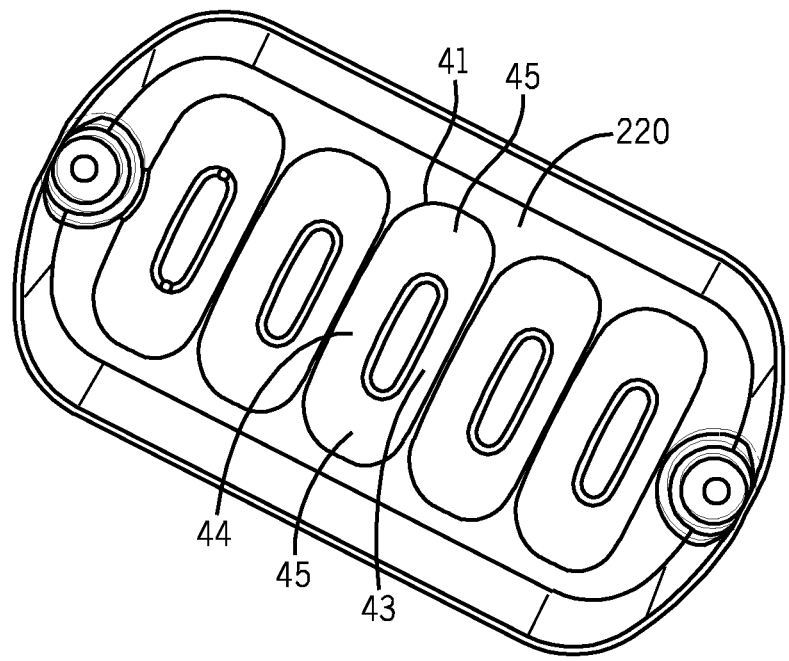
FIG. 40 is a back perspective view of the single lens piece of FIG. 39.
Figure 41:
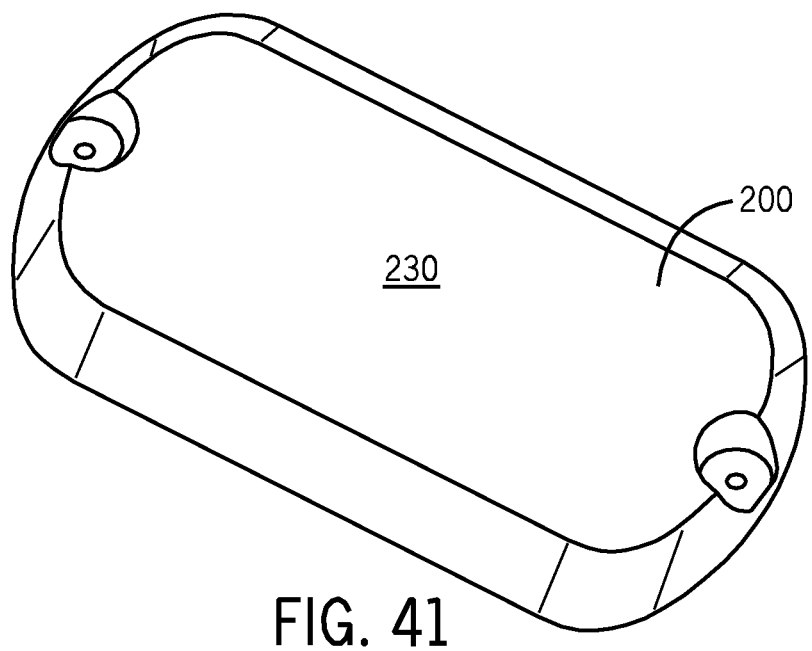
FIG. 41 is a front perspective view of the single lens piece of FIG. 39 shown opaque.
Figure 42:
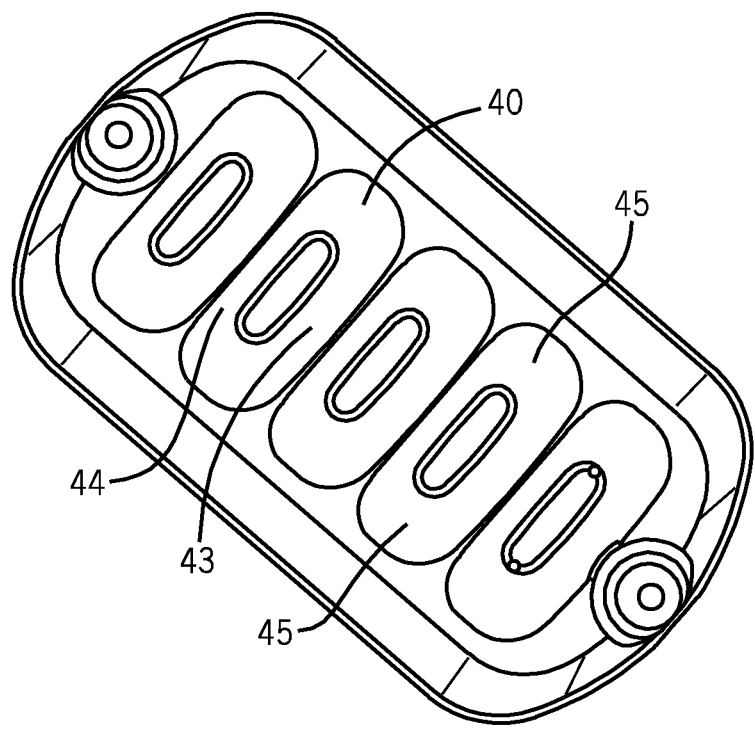
FIG. 42 is a back perspective view of the single lens piece as in FIG. 41.
Figure 43:
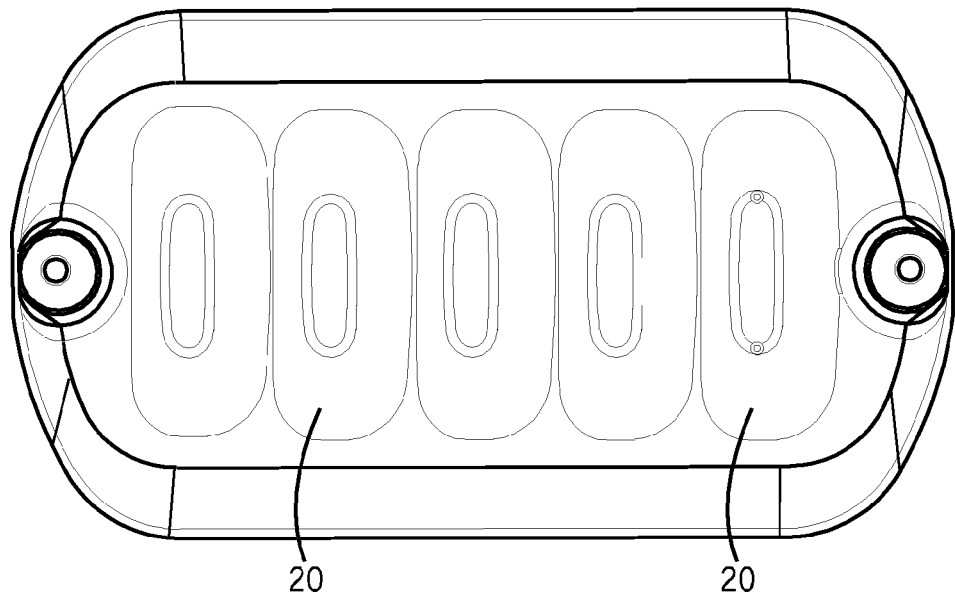
FIG. 43 is a front elevation of the single lens piece of FIG. 39.

FIGS. 40 and 42 show lateral surface 40 including opposed preferential and non-preferential surface portions 43 and 44 adjoined by opposed curved portions 45. FIGS. 48 and 54 show opposed preferential and non-preferential surface portions 43 and 44 and curved portions 45 extending outwardly from base-adjacent region 46 to distal edge 41. FIGS. 33, 34, 47 and 54 illustrate non-preferential surface portion 44 being at an angle to base plane 25 which is greater than an angle of preferential surface portion 43 to the base plane 25.

It is also seen in FIGS. 30 and 33 that an outer output surface 28 receives light from inner end surface 31 and from TIR surface 40. Such light exits output surface 28 predominantly toward preferential side 11.

FIGS. 40-44, 42-44 and 48 best illustrate lens-portion opening 26 being elongate in the direction substantially perpendicular to line 2 of lens members 20 and being adapted to receive light from a group of light emitters 61 aligned along opening 26. FIGS. 34, 53 and 54 best show end surface 31 being substantially planar and elongate in the direction substantially perpendicular to line 2 and surrounding surface 32 having a racetrack shape.

Refracting inner surface 30 forms void 27 which is also shown elongate across a preferential direction. Void 27 is shown formed with racetrack-shaped inner surrounding surface 32 substantially orthogonal to base plane 25 and substantially planar elongate inner end surface 31 configured to direct light from the group of light emitters 61 in the preferential direction. Lateral surface 40 is shown positioned for receiving light refracted by racetrack-shaped inner surrounding surface 32 for directing received light predominantly in the preferential direction.

Figure 50:
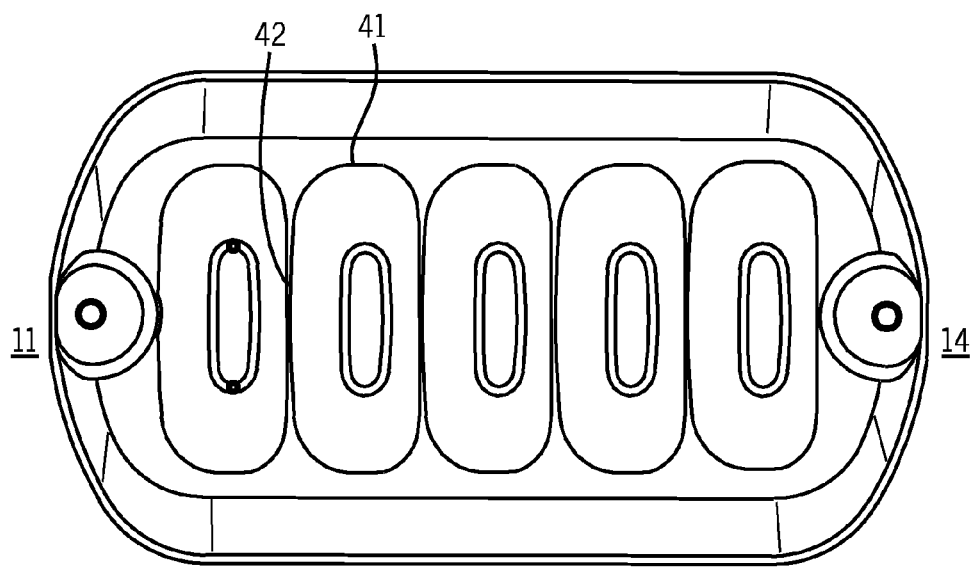
FIG. 50 is a back elevation of the single lens piece as in FIG. 49.
Figure 51:
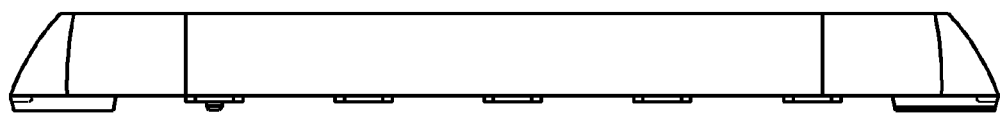
FIG. 51 is a lateral view of the single lens piece as shown in FIG. 49.
Figure 52:
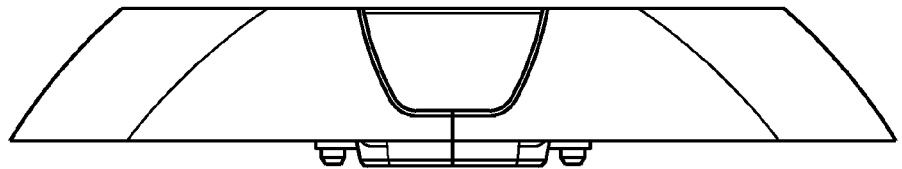
FIG. 52 is a side view of the single lens piece as shown in FIG. 49.

FIGS. 39, 40 and 42-44 illustrate TIR surface 40 extending from emitter-adjacent base end 24 to racetrack-shaped edge 41 distal from base plane 25. FIGS. 44 and 50 show distal edge 41 having a substantially-straight edge portion 42 on non-preferential side 14.

Figure 31:
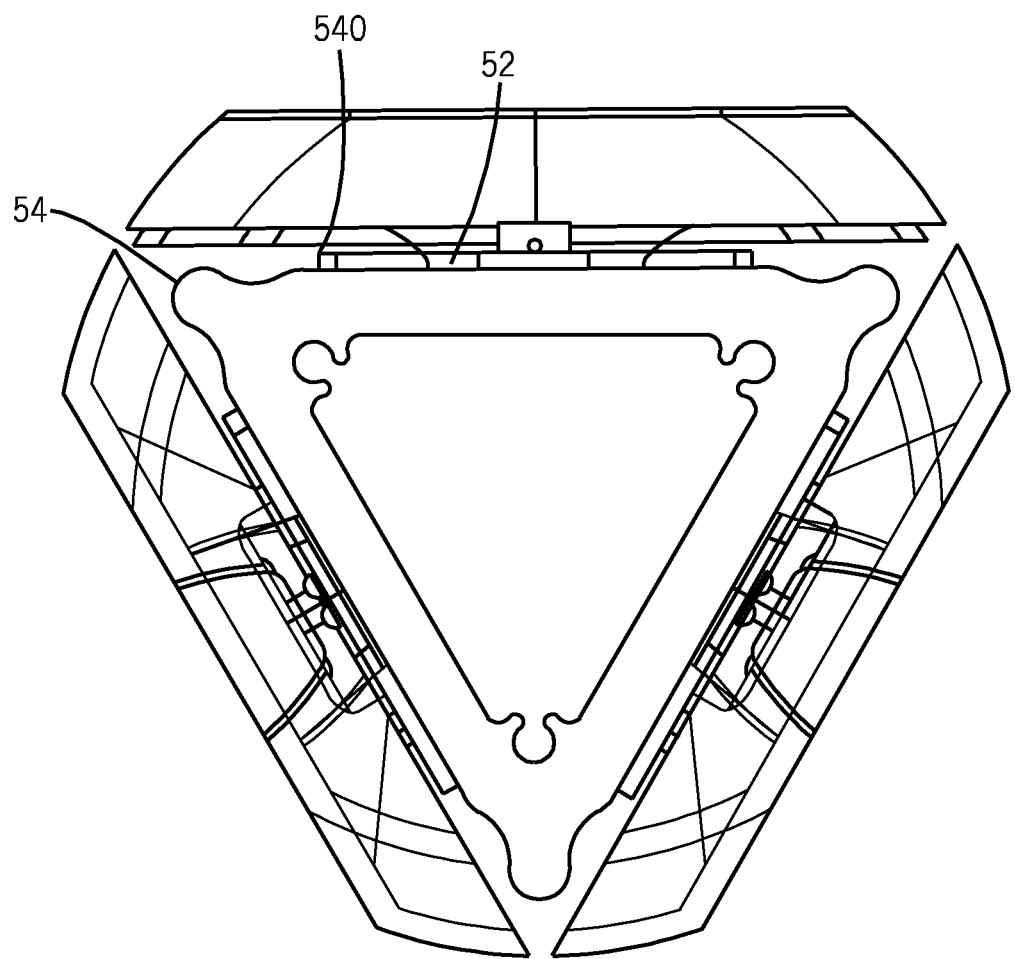
FIG. 31 is a top view of the inventive LED arrangement and showing a side view of an embodiment of an elongate lens according to the present invention.
Figure 32:
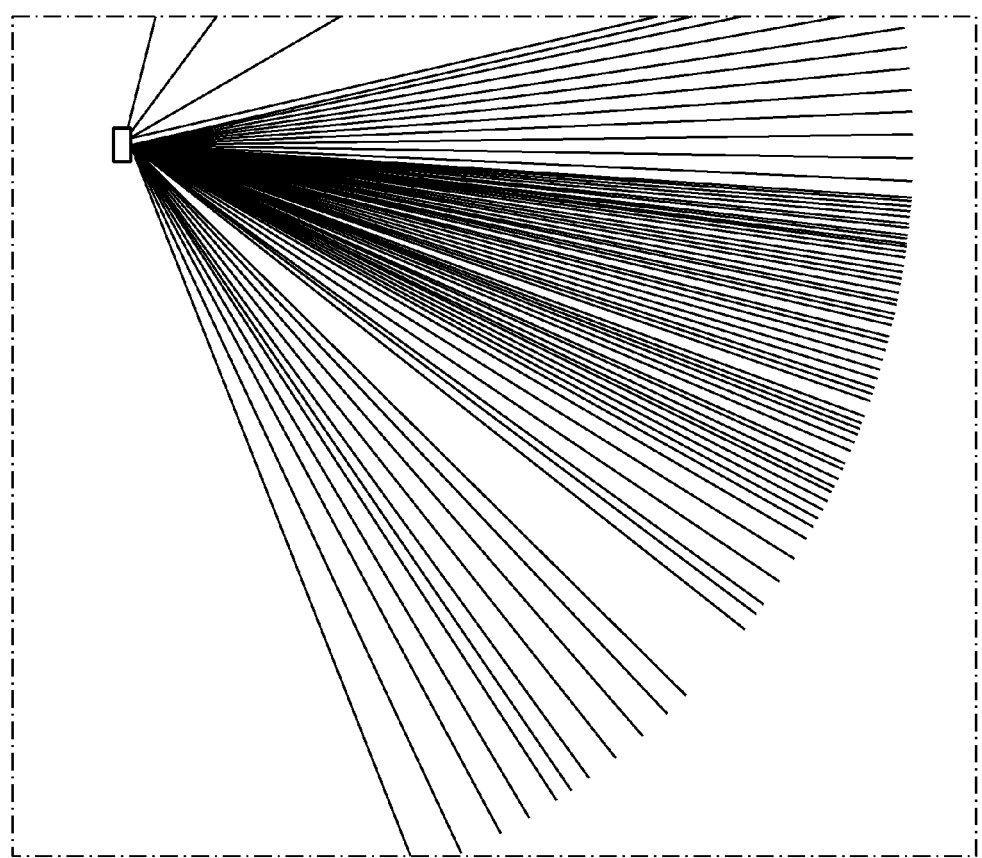
FIG. 32 is a schematic side ray trace of the lens according to the present invention.
Figure 38:
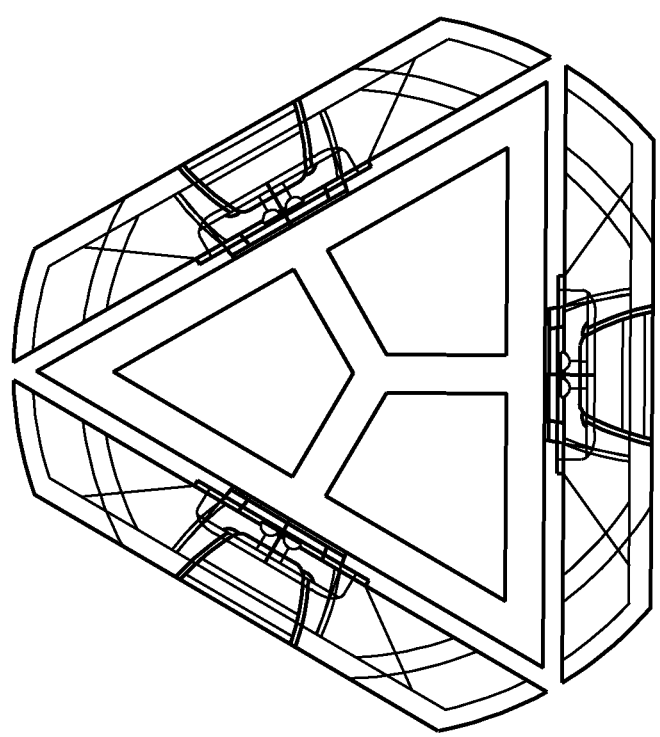
FIG. 38 is a cross-sectional view of the LED arrangement shown in FIG. 31.
Figure 39:
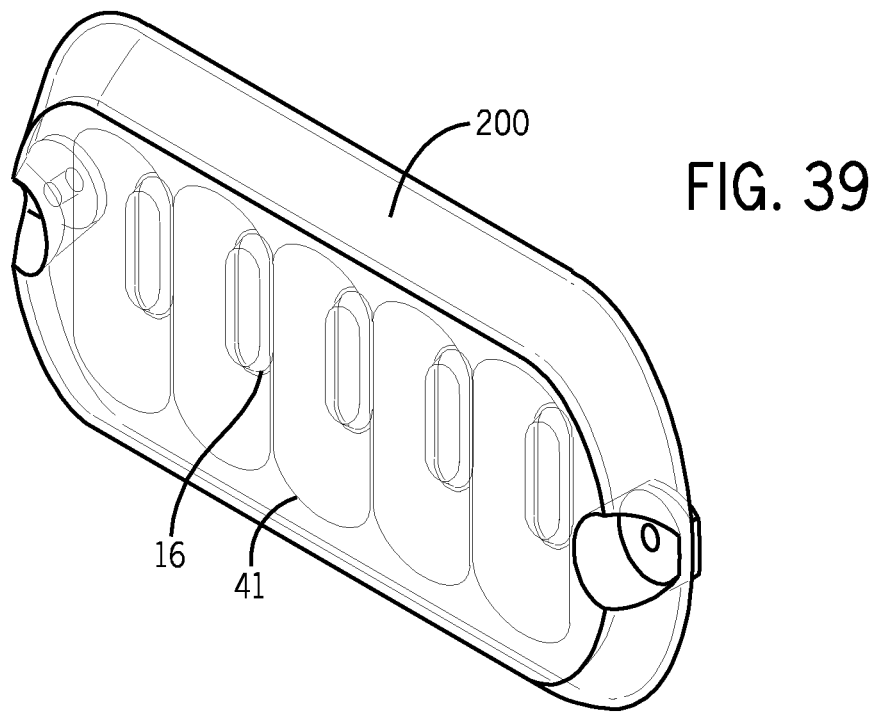
FIG. 39 is a preferential-side front perspective view of one embodiment of a single lens piece according to this invention.

FIGS. 47 and 48 best show outer output surface 28 being substantially planar. FIGS. 30, 31 and 38 best show outer output surface 28 being substantially parallel to substantially-planar mounting board 12. FIGS. 45-48 and 53 and 54 illustrate flange portions 22 of each of lens members 20 having an outer surface 29 coplanar with outer output surface 28 of the corresponding lens member 20. FIGS. 39-54 illustrate the plurality of lens members 20 being parts of a single lens piece 200 with flange portions 22 of the plurality of lens members 20 being molded together forming unified flange portion 220 of single lens piece 200. FIGS. 48 and 54 further illustrate single lens piece 200 having an outer wall 23 which includes outer output surfaces 28 and unified flange portion 220. Single lens piece 200, also referred to herein as a unitary lens, has a substantially flat outer face 230 substantially parallel to base plane 25.

FIG. 48 shows lateral portions 17 extending laterally from flange portions 22 along curves which are parts of a circular cylinder with an axis of revolution being parallel to preferential/non-preferential line 2. Flange portions 22 of each lens member 22 and unified flange portion 220 of single lens piece 200 each have an inner face 35 extending from TIR surface 40. In some embodiments, inner face 35 may include matte finish to diffuse light which escapes TIR surface and to provide further "glow" effect further enhancing the substantially uniform luminance.

Figure 7:
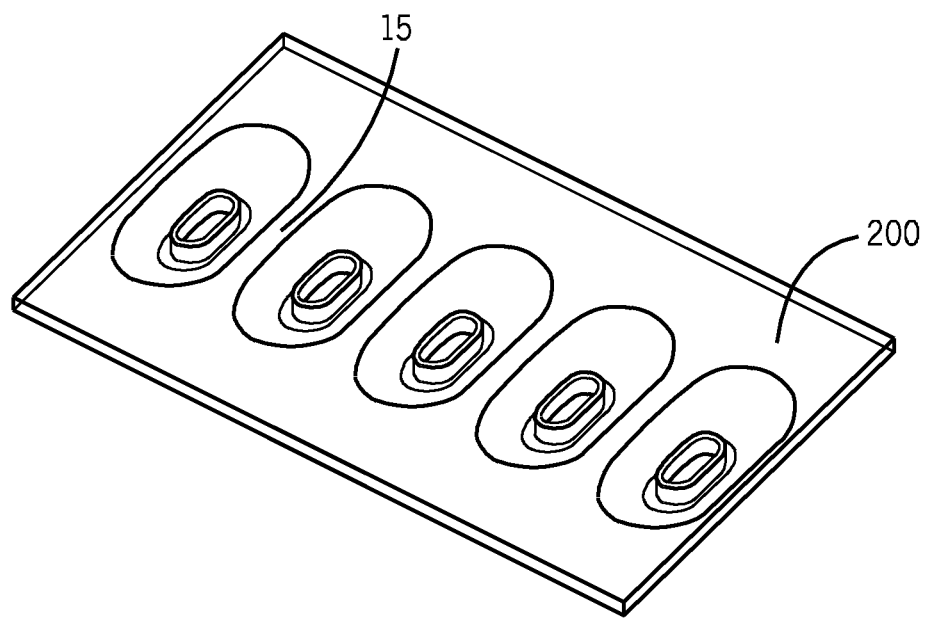
FIG. 7 is a perspective view of an exemplary embodiment an inventive unitary lens.

FIGS. 2, 7, 33, 39, 40, 42-45, 47, 50 and 54 show aligned elongate lens members 20 positioned with a minimal gap 15 therebetween such that unitary lens 200 has substantially continuous light emission across the group of aligned elongate lens members 20 to form a substantially uninterrupted light field to an observer facing unitary lens, as illustrated in FIGS. 5 and 33. FIGS. 2 and 7 show the minimal gap being about one fifth of a greatest lens-member dimension along preferential/non-preferential line 2. FIGS. 33, 39, 40, 42-45, 47, 50 and 54 illustrate substantially no gap between lens members 20 which have an outermost edge 16 contacting outermost edge 16 of adjacent lens member 20.

Another aspect of this invention may be useful for retrofit LED light fixtures 50, which by using a plurality of LED emitters and utilizing LED lensing 10, substantially imitate appearance of a single light source such as an HID light bulb, as shown in FIG. 5.

Figure 18:
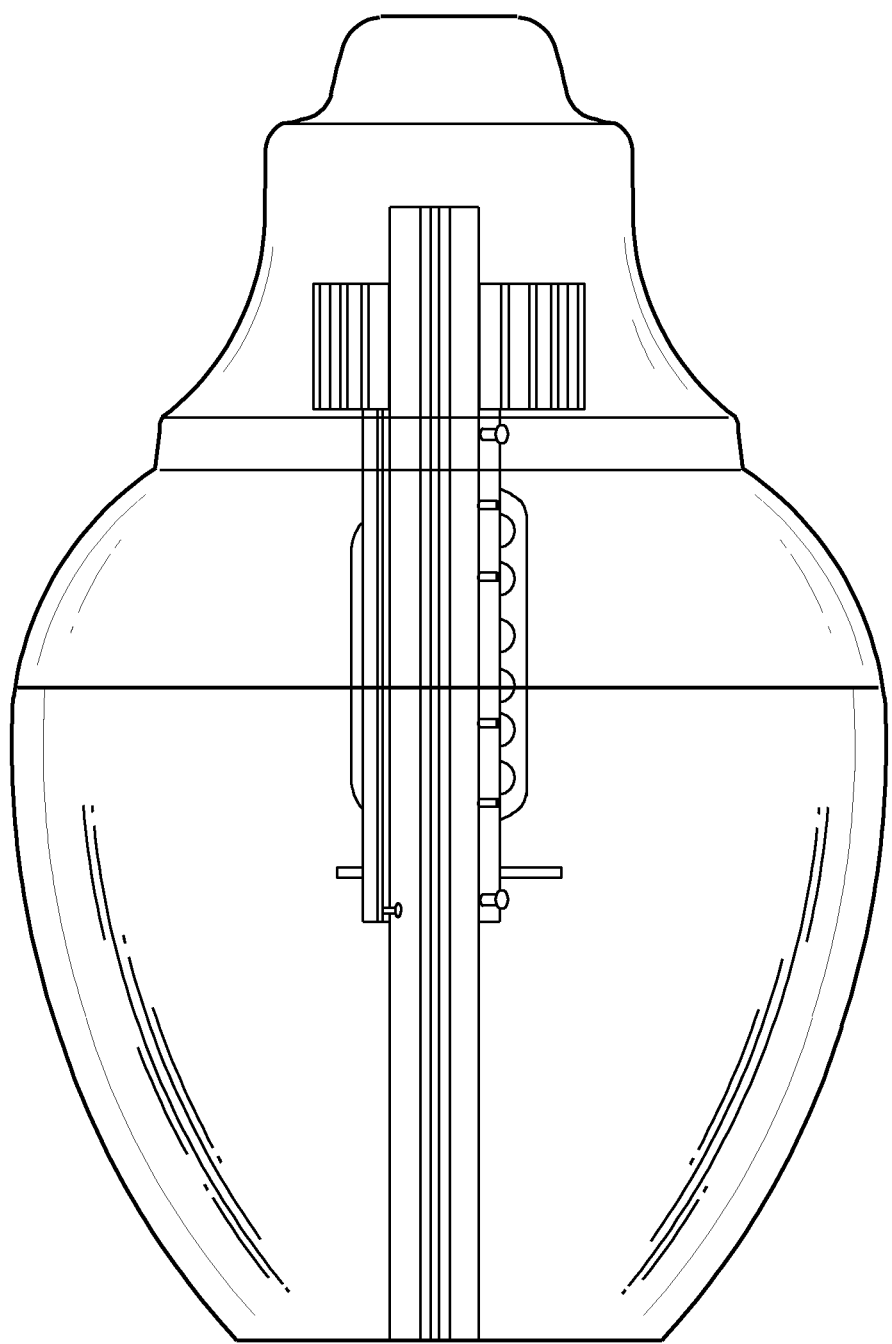
FIG. 18 is a side view opposite to the side view shown in FIG. 4.
Figure 19:
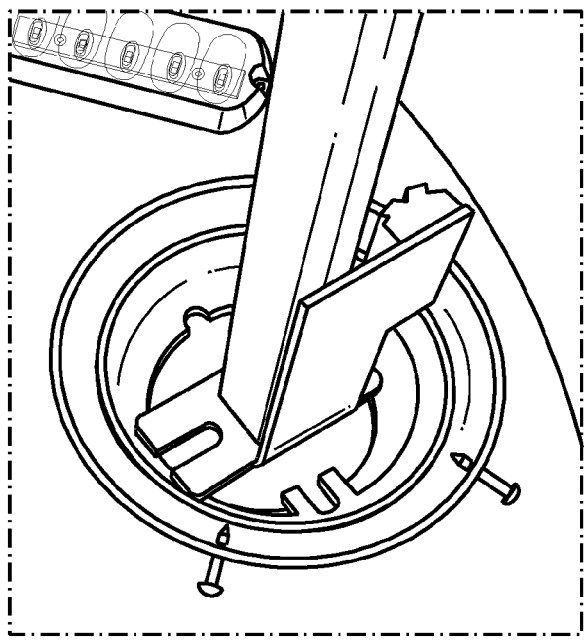
FIGS. 19-25 show assembly of the inventive LED arrangement.
Figure 20:
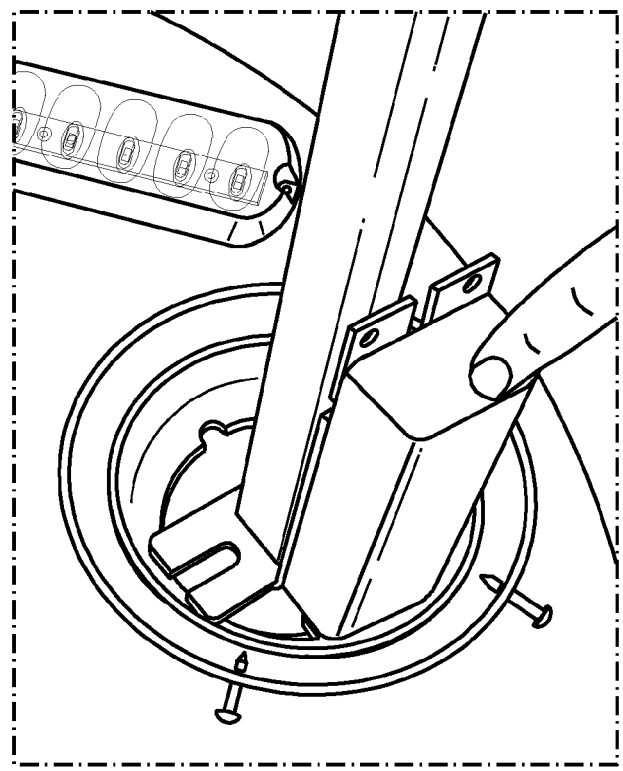
Figure 21:
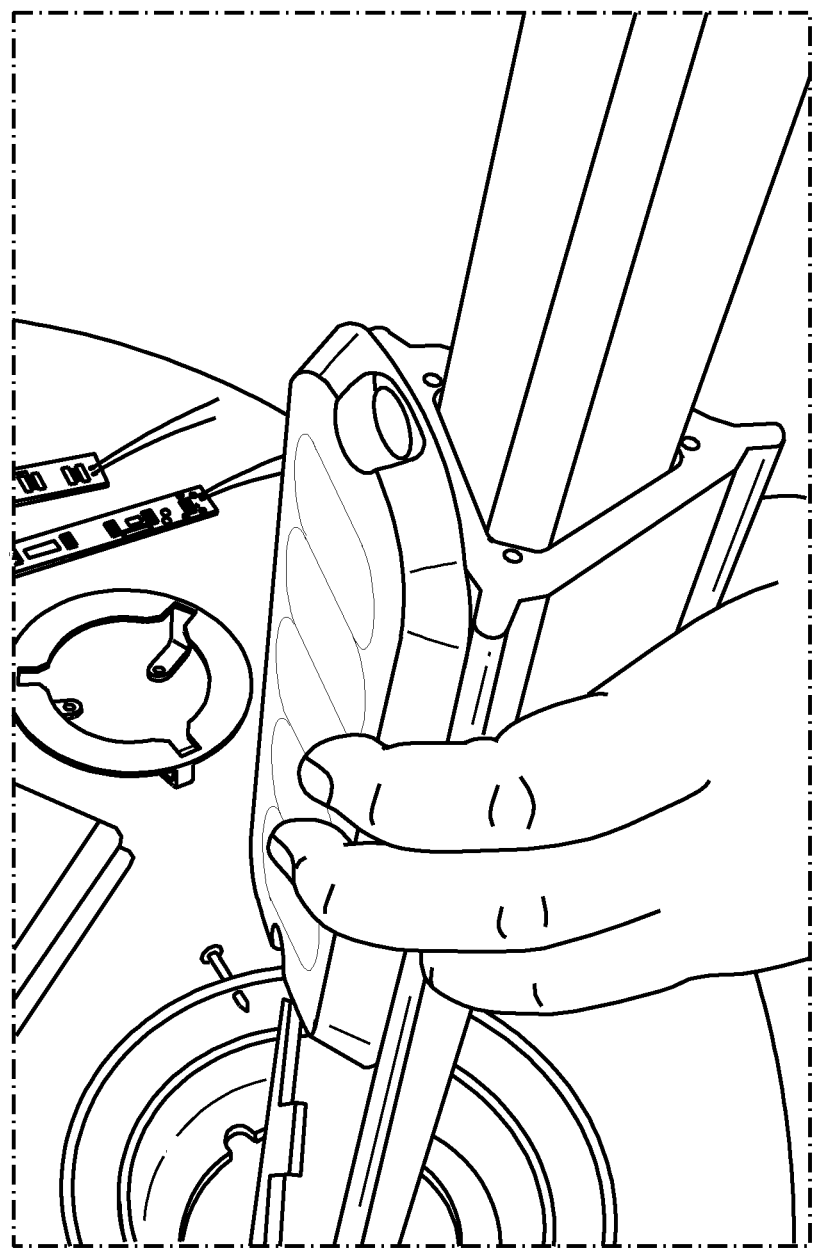
Figure 29:
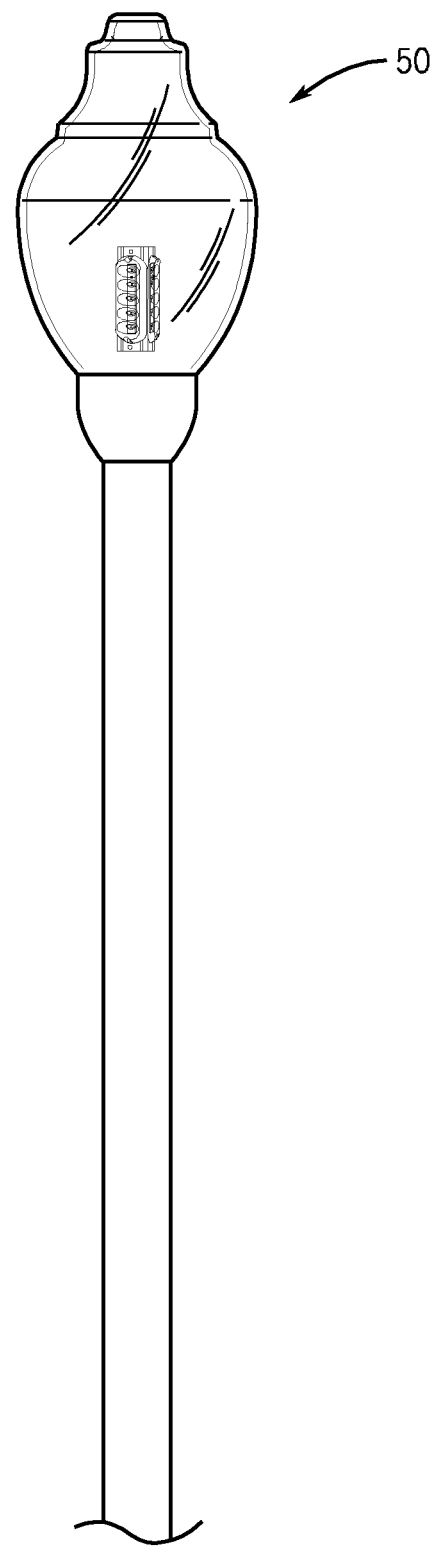
FIG. 29 is a side view of an "acorn" light fixture retrofitted with an LED arrangement according to the present invention.

FIGS. 1 and 29 illustrate an LED arrangement 51 which includes apparatus 100 positioned inside an old style globe-type lens 53 for an "acorn" fixture. FIGS. 2, 3, 8 and 9 show that LED arrangement 51 includes three LED-array modules 52 positioned with respect to each other to form a substantially closed shape which imitates a single non-LED light source such as an HID light bulb. As seen in FIGS. 1, 4 and 18, LED arrangement 51 is in substantially same position within globe lens 53 as would previously be taken by a non-LED light source. Schematic light distribution of "acorn" retrofit LED light fixture including LED arrangement 51 is illustrated in FIGS. 10-14 and 28.

Figure 8:
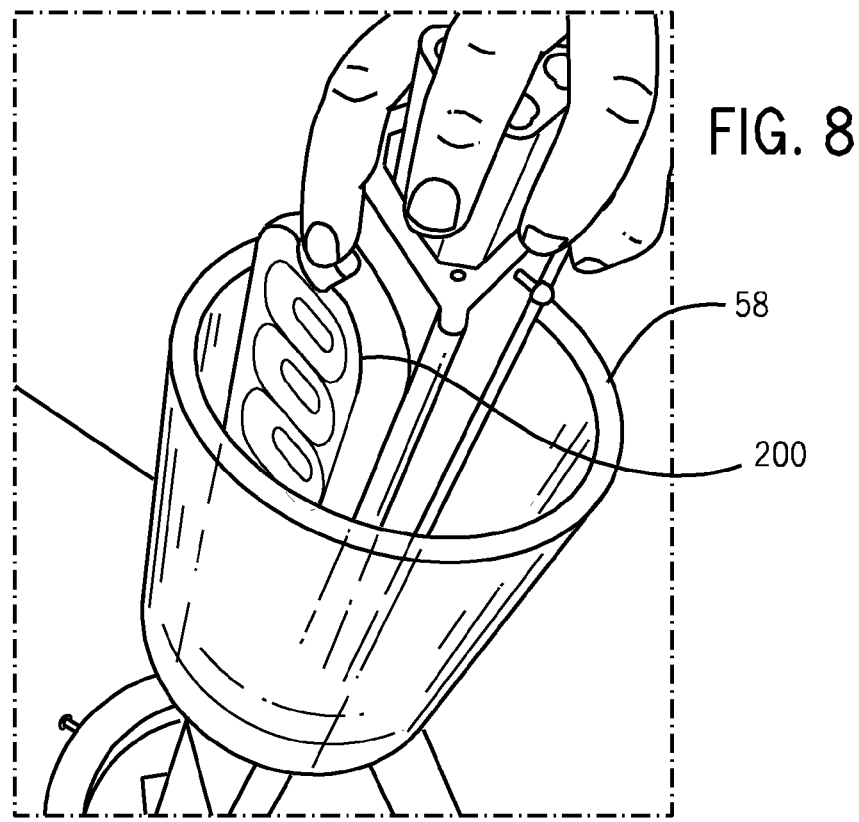
FIG. 8 is a perspective view from above of the LED arrangement of FIG. 2 with an intermediate refractor positioned over the unitary lens.
Figure 26:
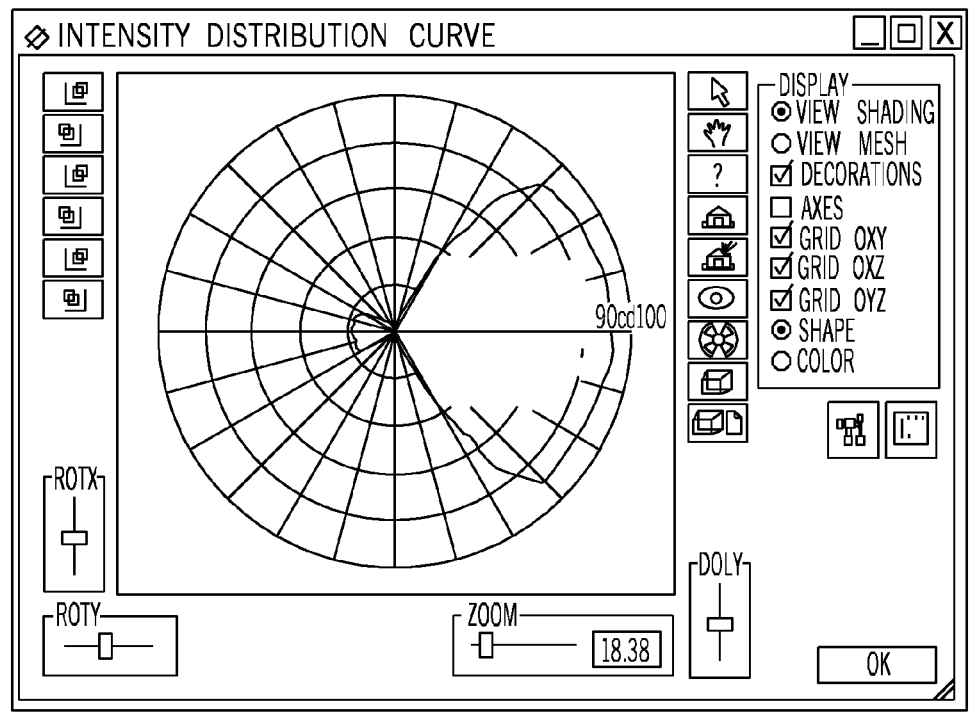
FIG. 26 is a top isoview of a single LED arrangement shown in FIG. 11.
Figure 27:
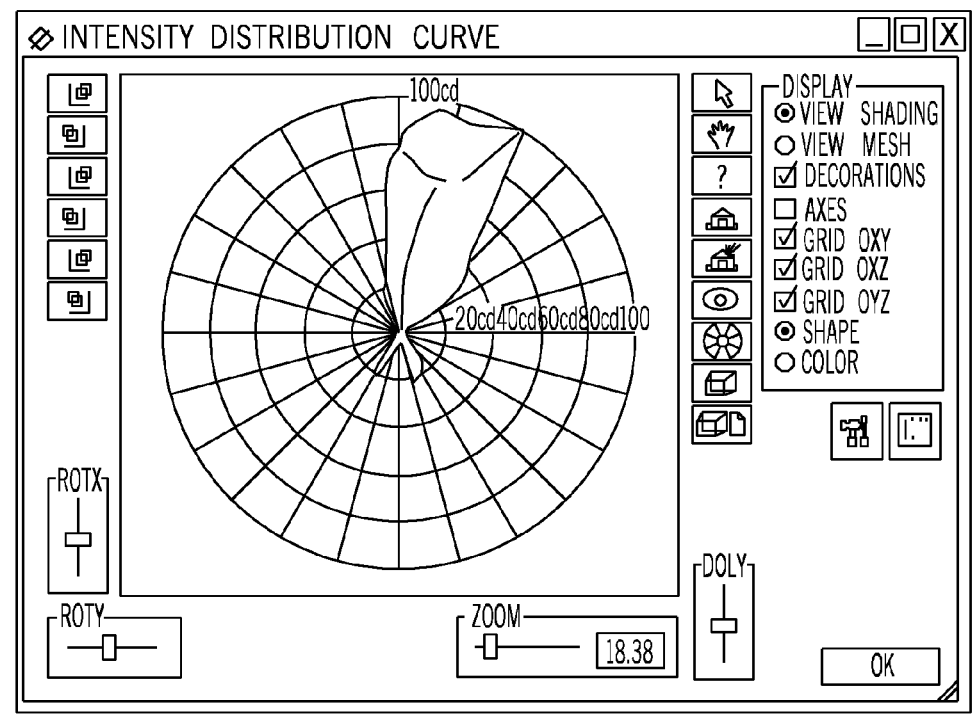
FIG. 27 is a side isoview of the single LED arrangement shown in FIG. 26.
Figure 28:
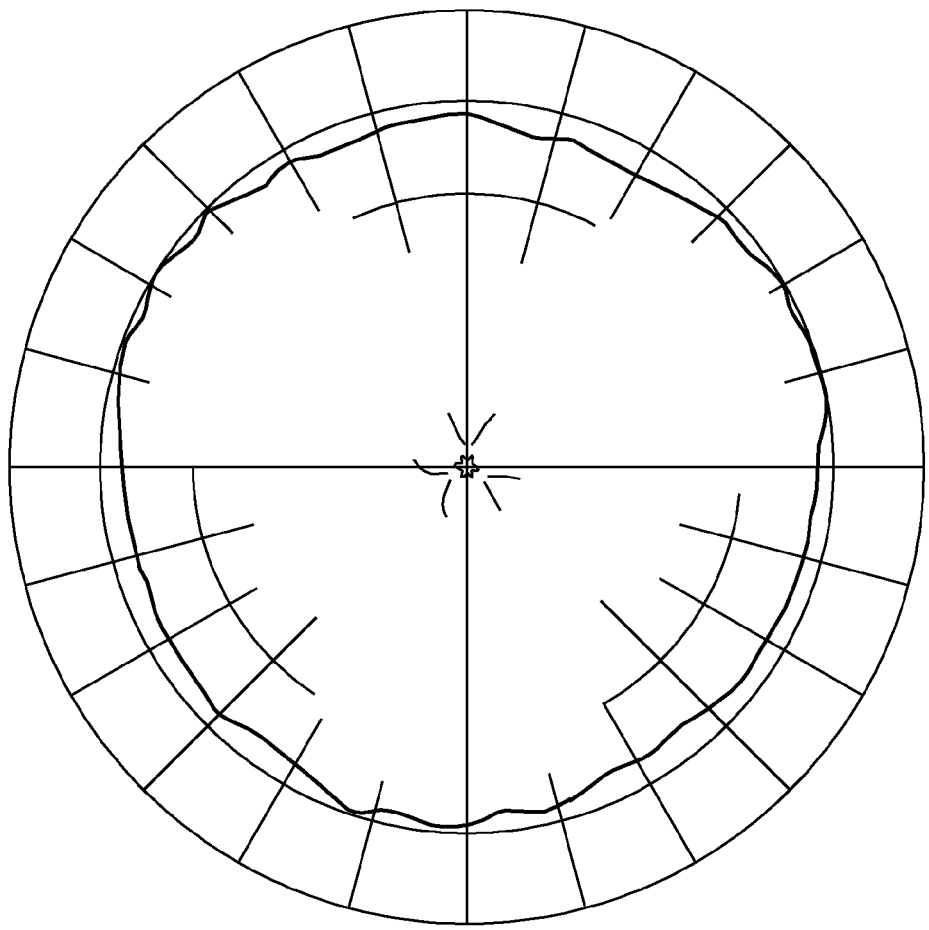
FIG. 28 is a top view of the 3-dimensional light distribution of the LED arrangement of FIGS. 2 and 3.

FIG. 2 further illustrates LED arrangement 51 which includes an LED-supporting sleeve 54 secured to a mounting post 55 which is inserted inside an existing light socket. FIGS. 8 and 31 best show LED-supporting sleeve 54 having three substantially planar sides 540 each supporting one of LED-array modules 52. FIG. 2 further shows unitary lens 200 positioned over each LED-array module 52. FIGS. 22-24 illustrate examples of LED array module 52 having five pairs of LEDs on mounting board 12. Each LED-array module 52 is secured to one side of LED-supporting sleeve 54 with a permanent heat-conductive adhesive and screws which provide preliminary alignment of LED module with preferential-non-preferential line 2. Different-power LEDs (as shown in FIG. 23) may be used for various light intensity, as may be desired in various fixture applications. FIGS. 26 and 27 show isoviews of a single LED arrangement 51.

Figure 3:
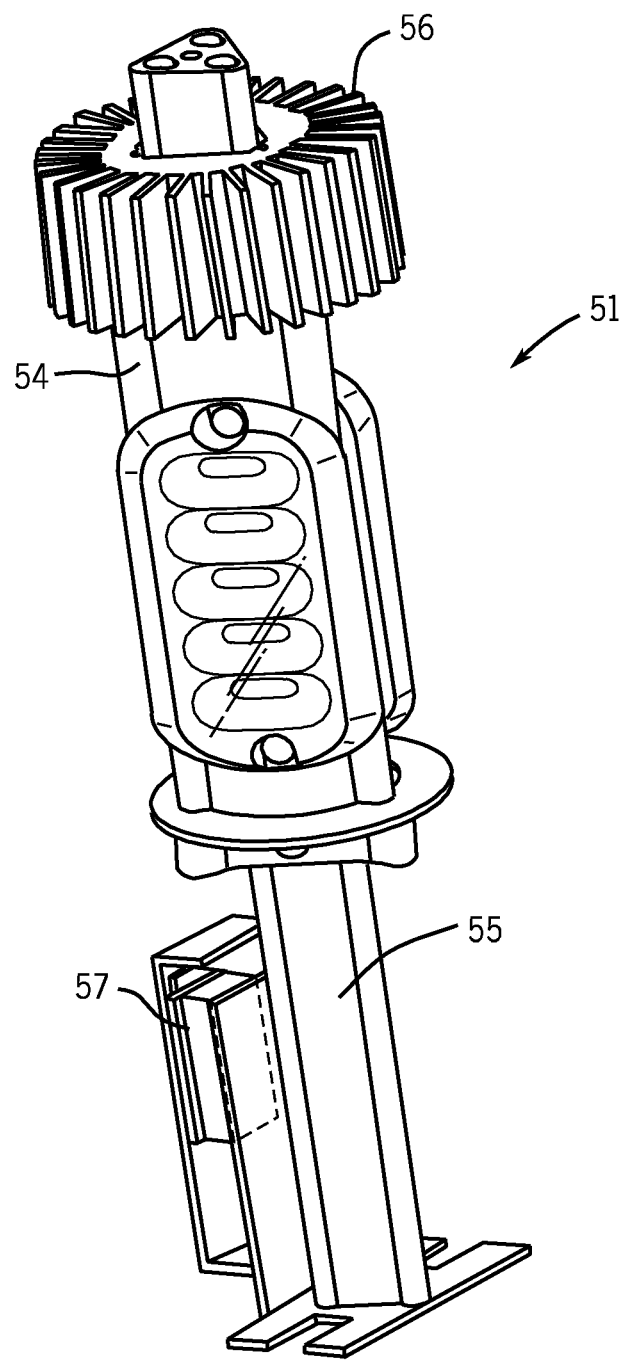
FIG. 3 is a perspective view of the inventive LED arrangement as in FIG. 2 and including an LED heat sink positioned atop thereof and an LED driver secured below.
Figure 4:
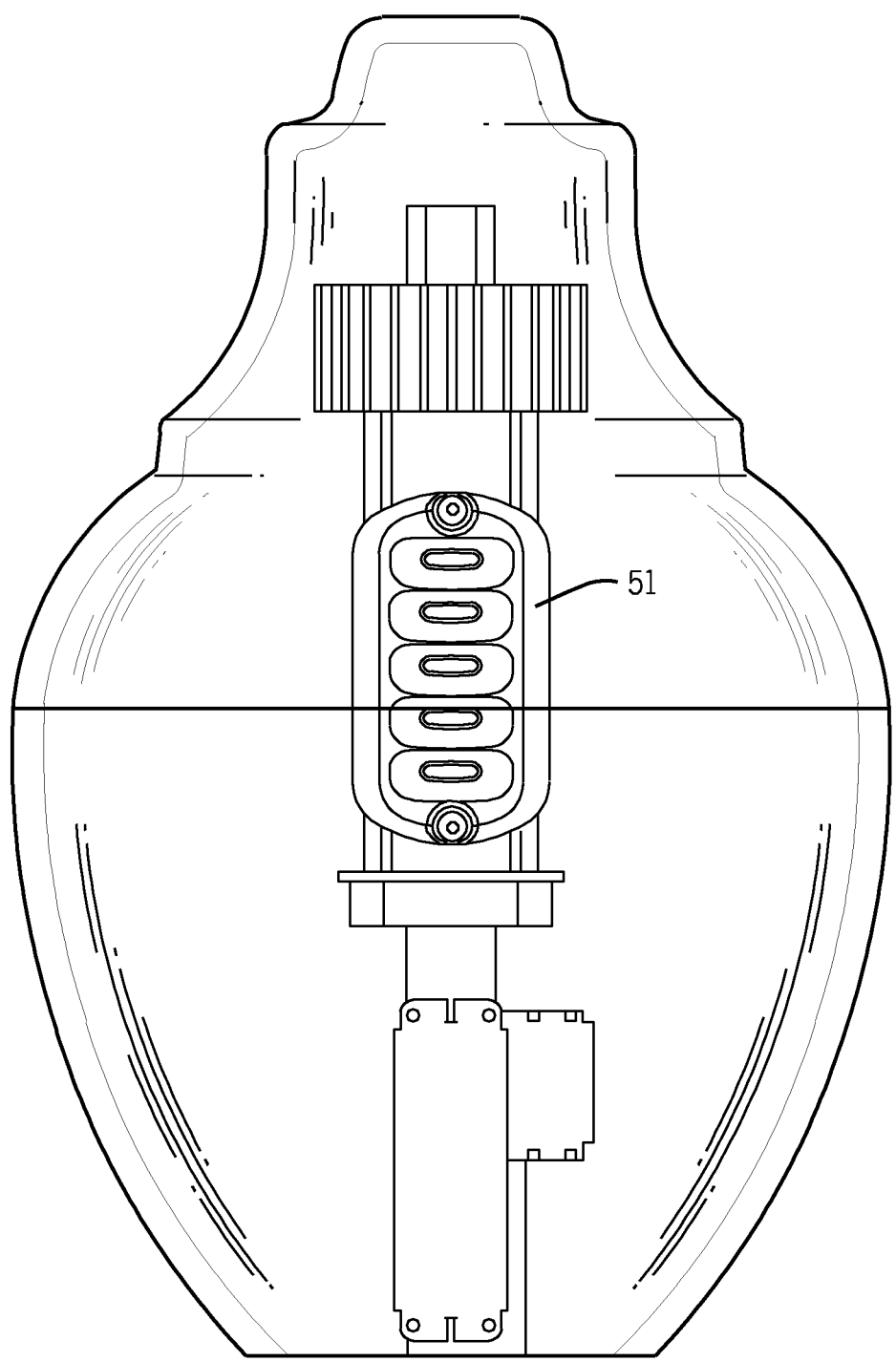
FIG. 4 is a side view of the LED arrangement of FIG. 3 positioned inside the "acorn" globe lens.
Figure 16:
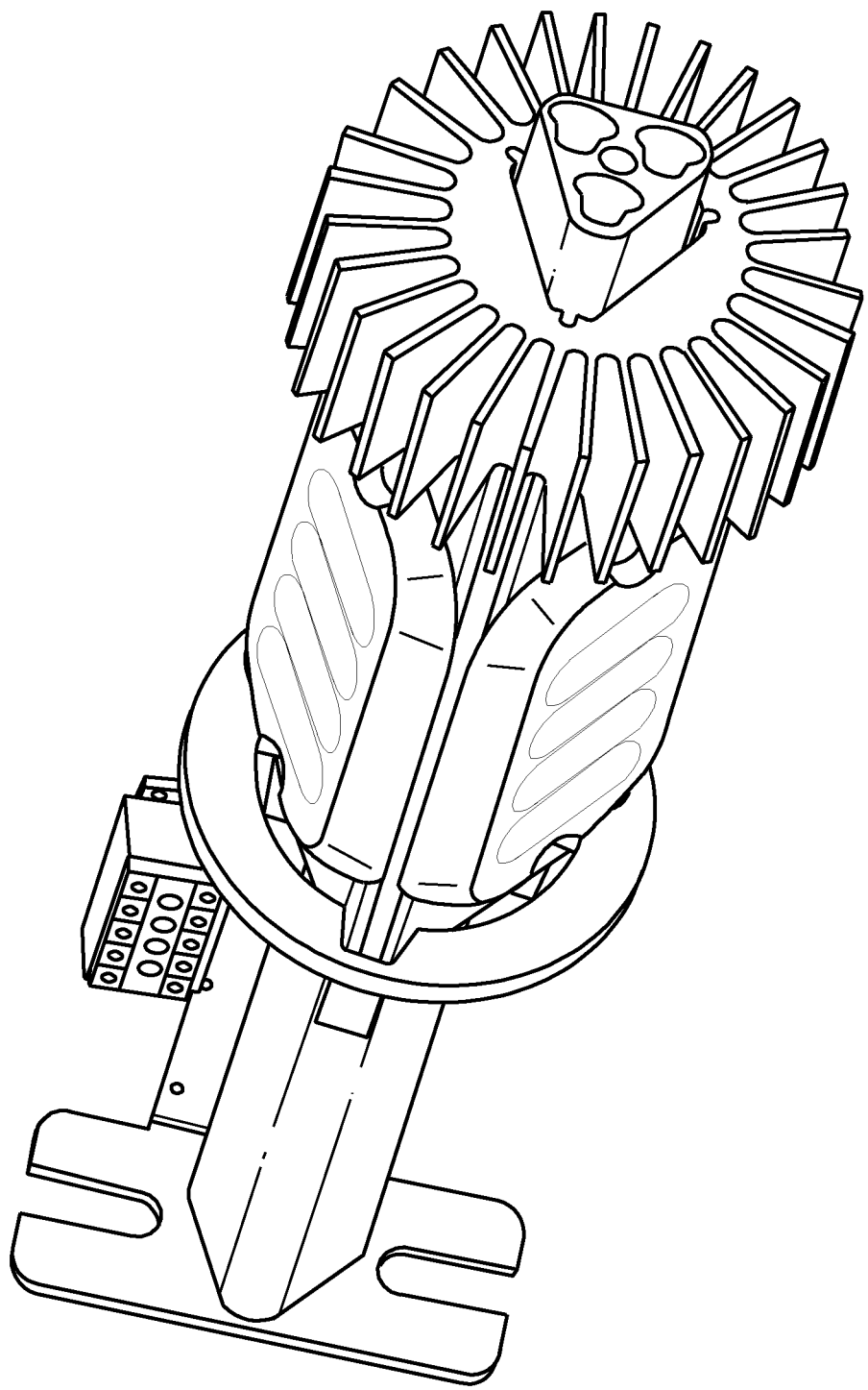
FIG. 16 is a top perspective view of the LED arrangement as in FIG. 3.
Figure 17:
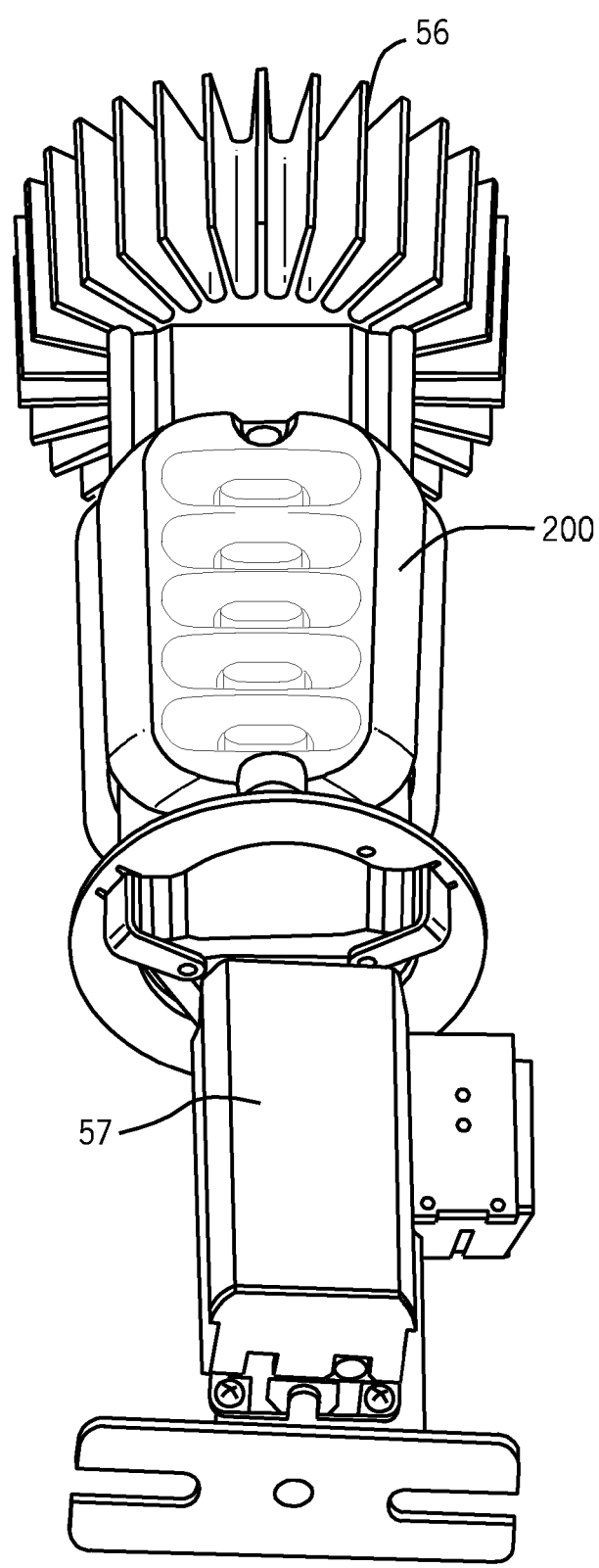
FIG. 17 is a bottom perspective view of the LED arrangement as in FIG. 3.

FIG. 3 shows LED arrangement 51 also including an LED heat sink 56 positioned atop LED-supporting sleeve 54 to facilitate heat dissipation from LEDs 61 through LED-supporting sleeve 54. FIGS. 3, 16 and 17 also show an LED driver 57 secured at a lower end of mounting post 55. FIGS. 19-25 show assembly of LED arrangement 51.

Figure 9:
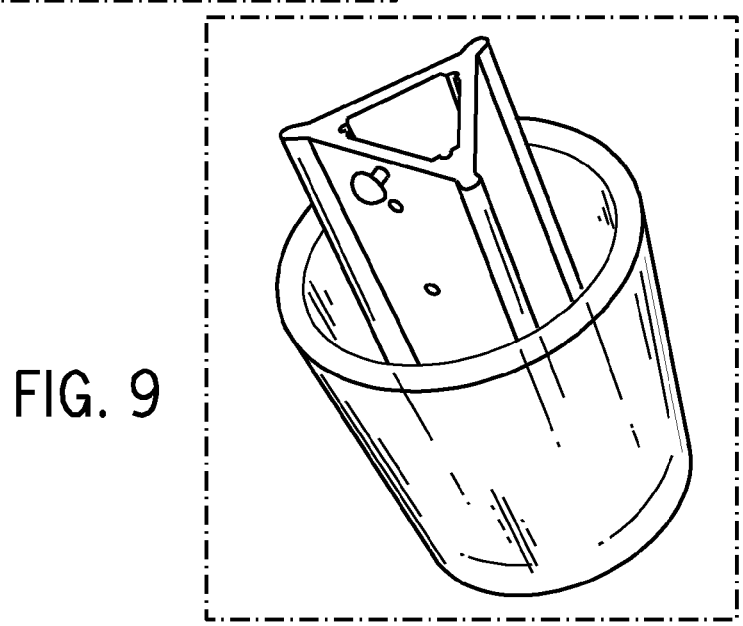
FIG. 9 is another perspective view from above showing just the LED-supporting sleeve positioned within the intermediate refractor.
Figure 10:
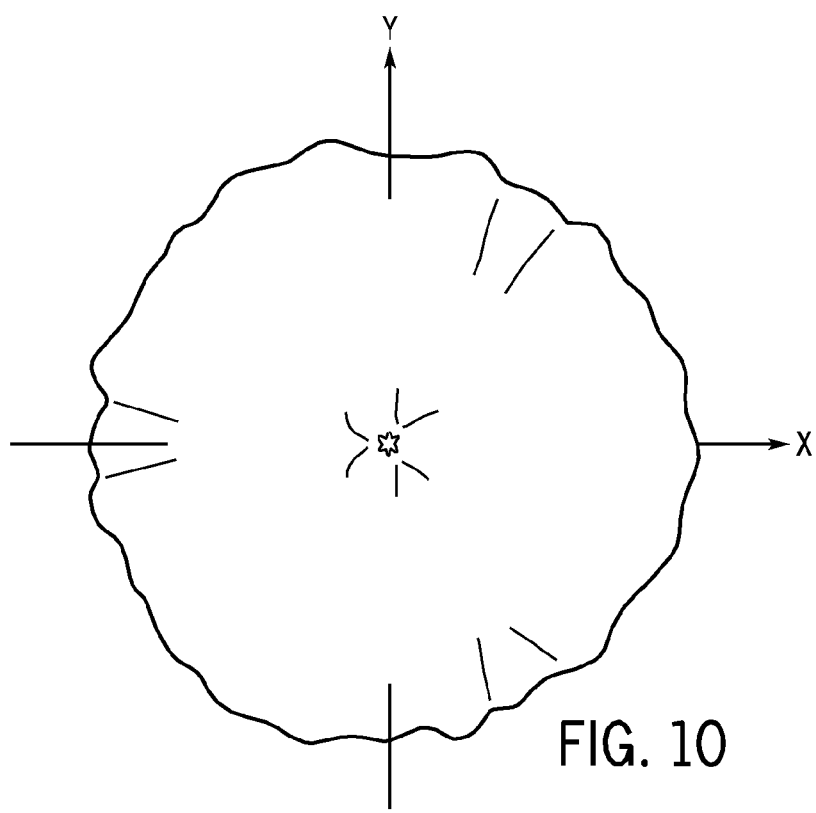
FIG. 10 is a top view of the 3-dimensional light distribution of the LED arrangement of FIGS. 2 and 3.
Figure 11:
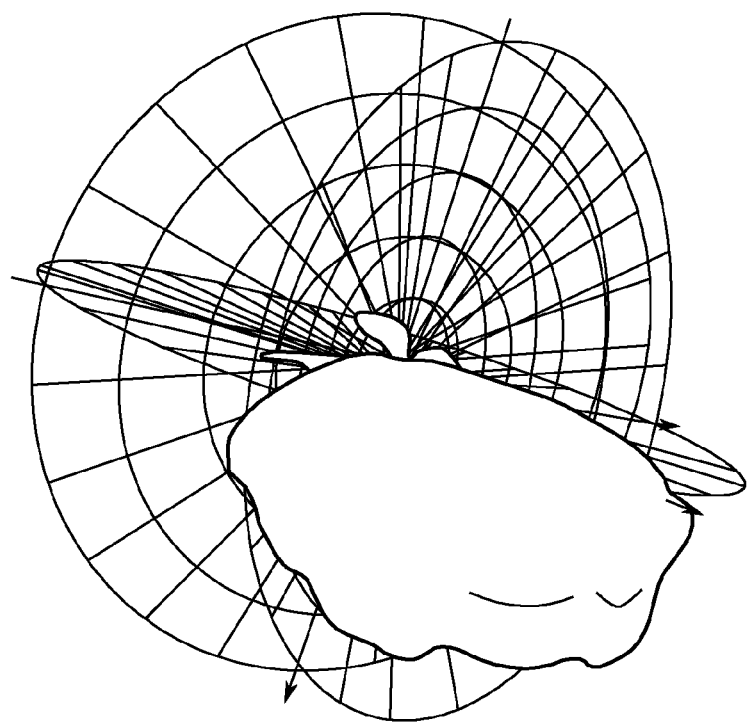
FIG. 11 is a top view of the 3-dimensional light distribution of a single LED arrangement which forms a ⅓ of the light distribution shown in FIG. 10.
Figure 12:
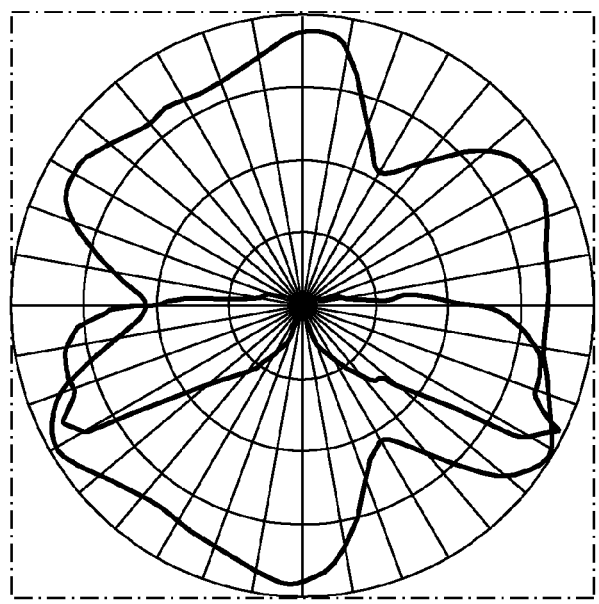
FIG. 12 is a polar plot of the inventive assembled "acorn" retrofit LED light fixture.
Figure 13:
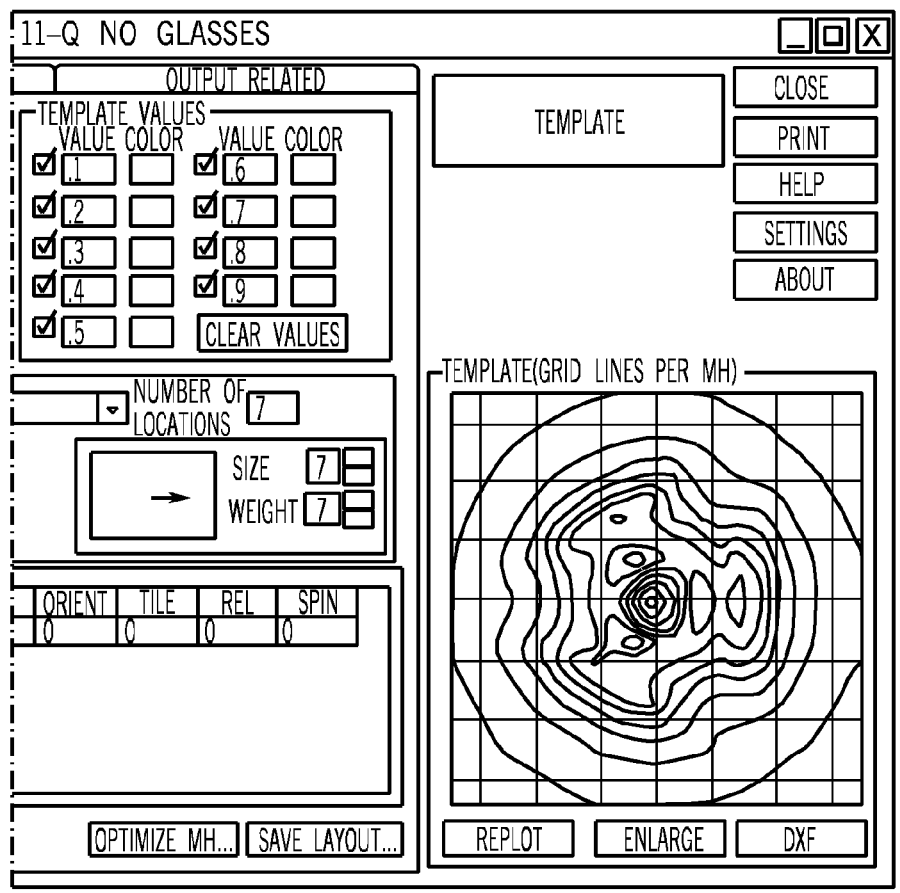
FIG. 13 is an iso plot of the inventive assembled "acorn" retrofit LED light fixture.
Figure 14:
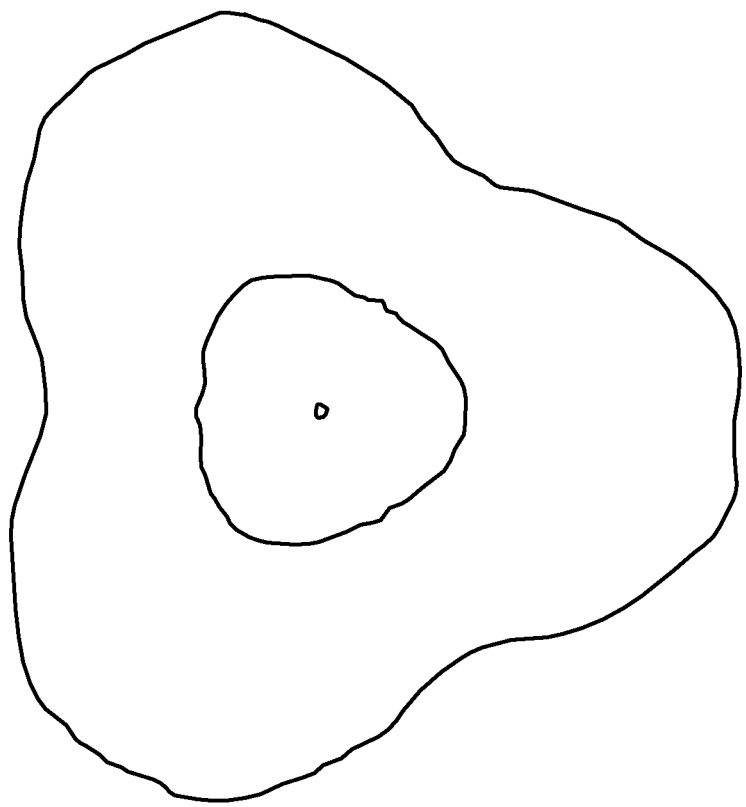
FIG. 14 is a top view of the 3-dimensional light distribution of the LED arrangement of FIGS. 2 and 3 inside an assembled "acorn" retrofit LED light fixture.
Figure 15:
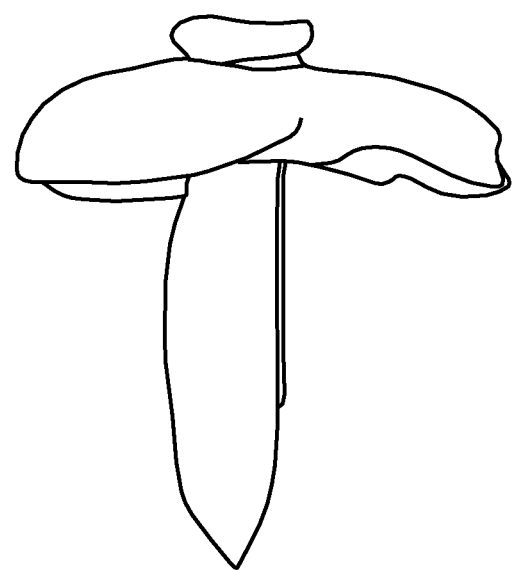
FIG. 15 is a side view of the 3-dimensional light distribution shown in FIG. 14.

FIGS. 8 and 9 show one version of LED arrangement 51 including an intermediate refractor 58 positioned over unitary lenses 200 to further blend emitted light for enhancement of a single-light source appearance. Intermediate refractor 58 is particularly useful when outer globe lens 53 is substantially transparent with little or no refractive surface texturing.

While the principles of this invention have been described in connection with specific embodiments, it should be understood clearly that these descriptions are made only by way of example and are not intended to limit the scope of the invention.

The invention claimed is:

1. An LED lens comprising:
   a refracting inner surface forming an elongate void with an elongate light-receiving opening defined by a pair of opposed curved edges each adjoining a pair of opposed elongate edges, the refracting inner surface being adapted to receive light from a group of light emitters aligned along the elongate edges of the opening;
   a reflecting lateral surface positioned radially around the refracting inner surface for receiving light refracted by the inner refracting surface and including a pair of opposed curved surface portions adjoining a pair of opposed elongate surface portions; and
   an output surface positioned to receive light from the refracting inner surface and from the reflecting lateral surface.

2. The LED lens of claim 1 wherein:
   the edges of the light-receiving opening define a base plane; and
   one of the elongate surface portions of the lens reflective lateral surface being at an angle to the base plane which is greater than an angle of the opposed elongate surface portion to the base plane such that light exits the lens predominantly in a direction which is transverse the elongation.

3. An LED lens piece for directing light toward a preferential side, the lens piece comprising a plurality of lens members aligned substantially along a preferential/non-preferential line, each lens member being elongate and adapted to receive light from a group of light emitters aligned transverse the preferential/non-preferential line, each lens member comprising:
   an inner refacting surface forming a void which is elongate transverse the preferential/non-preferential line with an elongate light-receiving opening defined by a pair of opposed curved edges adjoining a pair of opposed elongate edges the elongate edges extending across the preferential/non-preferential line and together with the curved edges defining a base plane;

a lateral reflecting surface positioned for receiving light refracted by the refracting inner surface and having opposed preferential and non-preferential surface portions extending away from the base plane to a distal edge which has elongate edge portions transverse the preferential/non-preferential line and adjacent to at least one elongate edge portion of an adjacent lens member; and an output surface positioned to receive light from the inner refracting surface and from the lateral reflecting surface such that light exits the lens member predominantly toward the preferential side.

4. The LED lens piece of claim 3 wherein, in each lens member:

the output surface is substantially flat and is substantially parallel to the corresponding base plane;

the refracting inner surface has an inner surrounding surface extending from the opening substantially orthogonally to the base plane and terminating at an inner end surface; and the non-preferential surface portion of the lateral reflecting surface is at an angle to the base plane which is greater than an angle of the preferential portion to the base plane.

5. The LED lens piece of claim 3 wherein the aligned elongate lens members are positioned with no more than a minimal gap between the elongate edge portions of the corresponding lateral reflecting surfaces.

6. The LED lens piece of claim 5 wherein, in the lateral reflecting surface of each of the aligned elongate lens members, the distal edge of the non-preferential surface portion is substantially straight.

7. An LED lighting apparatus comprising:

a plurality of LED light sources spaced along a length of an elongate mounting board, each LED light source including a group of LED emitters aligned substantially perpendicular to the length of the mounting board; and a plurality of lens members adjacent to one another and being aligned along the mounting-board length, each lens member having an inner refracting surface forming a void which is elongate transverse the length of the mounting board with an elongate light-receiving opening defined by a pair of opposed curved edges adjoining a pair of opposed elongate edges, each lens member being positioned over a corresponding LED light source, the lens members directing light substantially along the length of the mounting board.

8. The LED lighting apparatus of claim 7 wherein:

the mounting board is substantially planar;

the plurality of LEI) light sources have respective emission axes which are substantially parallel to one another and are substantially perpendicular to the mounting board; and the lens members direct light from the LED light sources in a primarily off-axial direction.

9. The LED lighting apparatus of claim 8 wherein the lens members direct light from the LED light sources primarily toward one common off-axial direction along the length of the mounting board.

10. The LED lighting apparatus of claim 7 wherein each lens member has a lens portion and a flange thereabout.

11. The LED lighting apparatus of claim 10 wherein the flange portions of the plurality of lens members are molded together forming a unified flange portion with the lens portions extending therefrom.

12. The LED lighting apparatus of claim 9 wherein each lens member includes:

an emitter-adjacent base end forming an opening around a corresponding emission axis;

an inner surface extending from the opening and defining a void terminating with an end surface which extends from the preferential side away from the base end across from the preferential side;

a total internal reflection (TIR) surface radially beyond the void and configured for directing light received from the inner surface in the common off-axial direction toward a preferential side along the length of the mounting board; and an outer output surface receiving light from the inner end surface and the TIR surface, such light exiting the output surface predominantly toward the preferential side.

13. The LED lighting apparatus of claim 12 wherein the opening of each lens member is elongate in the direction substantially perpendicular to the length of the mounting board.

14. The LED lighting apparatus of claim 13 wherein the inner surface includes a surrounding lateral surface extending from the opening to the end surface substantially orthogonally to the mounting board.

15. The LED lighting apparatus of claim 14 wherein the end surface of each lens member is substantially planar and elongate in the direction substantially perpendicular to the length of the mounting board.

16. The LED lighting apparatus of claim 15 wherein the TIR surface extends from the emitter-adjacent base end to an edge distal therefrom, the distal edge having a substantially-straight edge portion on the preferential side.

17. The LED lighting apparatus of claim 16 wherein the TIR surface has elongate opposed preferential and non-preferential surface portions adjoined by two opposed lateral surface portions, the non-preferential surface portion being at an angle to the mounting board which is greater than an angle between the mounting board and the preferential surface portion, thereby directing light from the corresponding LED light source predominantly toward the preferential side.

18. The LED lighting apparatus of claim 16 wherein the outer output surface is substantially planar.

19. The LED lighting apparatus of claim 12 wherein the outer output surface is substantially planar.

20. The LED lighting apparatus of claim 19 wherein the outer output surface is substantially parallel to the mounting board.

21. The LED lighting apparatus of claim 19 wherein:

the plurality of lens members are parts of a single lens piece;

each lens member has a lens portion and a flange thereabout;

the flange portions of the plurality of lens members are molded together as a unified flange portion of the single lens piece;

the unified flange portion has an outer surface coplanar with the outer output surfaces of the plurality of lens members; and the single lens piece has an outer wall which includes the outer output surfaces and the unified flange portion.

22. The LED lighting apparatus of claim 7 wherein:

each LED light source includes at least one primary lens; and the corresponding lens member is a secondary lens placed over the at least one primary lens.

23. The LED lighting apparatus of claim 22 wherein each LED emitter is an LED package having a primary lens over at least one LED.

24. An LED lighting apparatus comprising:
a plurality of light emitters each having an emitter axis;
a plurality of lenses aligned substantially along a preferential/non-preferential line and each positioned over a corresponding light emitter for directing light therefrom in an off-axial direction with respect to the respective emitter axis toward a preferential side, each lens including:
an inner surface extending from an emitter-adjacent base end forming an opening into a void terminating with a substantially planar inner end surface extending from the preferential side away from the base end across the emitter axis toward a non-preferential side;
a lateral surface radially beyond the void and configured for internally reflecting light received from the inner surface toward the preferential side; and
an output-end surface positioned to receive light from the inner surface and from the lateral surface such that light from the emitter exits the output-end surface predominantly toward the preferential side.

25. The LED lighting apparatus of claim 24 wherein, in each lens, the lateral surface terminates proximal to the output-end surface at distances from the emitter axis which are greater on the preferential side than on the non-preferential side.

* * * * *